US010827387B2

United States Patent
Tsuda

(10) Patent No.: US 10,827,387 B2
(45) Date of Patent: *Nov. 3, 2020

(54) APPARATUS FOR ROUTING TRAFFIC IN A PLURALITY OF CELL GROUPS EACH INCLUDING TWO OR MORE CELLS

(71) Applicant: Sony Corporation, Tokyo (JP)

(72) Inventor: Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,067

(22) Filed: Oct. 20, 2018

(65) Prior Publication Data

US 2019/0053101 A1    Feb. 14, 2019

Related U.S. Application Data

(63) Continuation of application No. 15/316,962, filed as application No. PCT/JP2015/064206 on May 18, 2015, now Pat. No. 10,172,040.

(30) Foreign Application Priority Data

Jul. 9, 2014    (JP) ................................ 2014-141234

(51) Int. Cl.
*H04L 12/28*    (2006.01)
*H04W 28/12*    (2009.01)
(Continued)

(52) U.S. Cl.
CPC ........... *H04W 28/12* (2013.01); *H04W 16/32* (2013.01); *H04W 24/08* (2013.01);
(Continued)

(58) Field of Classification Search
CPC ............. H04W 52/18; H04W 52/0209; H04W 28/0236; H04W 88/10; H04W 36/22;
(Continued)

(56) References Cited

U.S. PATENT DOCUMENTS 8,478,192 B2    7/2013  Lagerman
8,863,066 B1 *  10/2014  Kozhaya ............. G06F 17/5077
                                                   716/126
(Continued)

FOREIGN PATENT DOCUMENTS

EP    2 083 592 A2    7/2009
JP    2003-125439 A    4/2003
(Continued)

OTHER PUBLICATIONS

"Consideration on intra-LTE energy saving solutions for small cell", China Unicom, 3GPP TSG RAN WG3 #79. R3-130127, XP050670930, 2013, pp. 1-3.

(Continued)

*Primary Examiner* — John Pezzlo
(74) *Attorney, Agent, or Firm* — Xsensus LLP

(57) ABSTRACT

[Object] To make it possible to reduce a load on a controller configured to perform centralized control of a network.
[Solution] There is provided an apparatus including: an acquisition unit configured to acquire traffic information relating to traffic of a cell group including two or more cells; and a provision unit configured to provide the traffic information for a control device, the control device being configured to perform routing control of traffic of a plurality of cell groups including the cell group.

20 Claims, 17 Drawing Sheets

(51) Int. Cl.
   *H04W 16/32* (2009.01)
   *H04W 24/08* (2009.01)
   *H04W 28/02* (2009.01)
   *H04W 52/02* (2009.01)
   *H04W 52/18* (2009.01)
   *H04J 1/16* (2006.01)
   *H04W 88/10* (2009.01)

(52) U.S. Cl.
   CPC ... *H04W 28/0236* (2013.01); *H04W 52/0209* (2013.01); *H04W 52/18* (2013.01); *H04W 88/10* (2013.01); *Y02D 70/1226* (2018.01); *Y02D 70/1242* (2018.01); *Y02D 70/1244* (2018.01); *Y02D 70/1262* (2018.01)

(58) Field of Classification Search
   CPC . H04W 8/22; Y02D 70/1244; Y02D 70/1262; Y02D 70/1242; H04L 47/10
   USPC .......................................... 370/252, 329, 386
   See application file for complete search history.

(56) References Cited

U.S. PATENT DOCUMENTS

| | | | |
|---|---|---|---|
| 2002/0037727 A1* | 3/2002 | McKenna | H04W 4/08 455/452.2 |
| 2003/0040317 A1 | 2/2003 | Fattouch | |
| 2005/0159167 A1* | 7/2005 | Hakalin | H04L 45/00 455/453 |
| 2007/0149138 A1* | 6/2007 | Das | H04L 1/0045 455/68 |
| 2009/0191888 A1 | 7/2009 | Abedi | |
| 2010/0039947 A1 | 2/2010 | Li et al. | |
| 2012/0063383 A1 | 3/2012 | Barbieri et al. | |
| 2014/0036762 A1* | 2/2014 | Al-Shalash | H04W 76/15 370/315 |
| 2014/0242939 A1 | 8/2014 | Salot et al. | |
| 2015/0111594 A1* | 4/2015 | Cui | H04W 28/08 455/453 |
| 2016/0262072 A1* | 9/2016 | Watanabe | H04W 36/22 |
| 2018/0048428 A1 | 2/2018 | Kim et al. | |

FOREIGN PATENT DOCUMENTS

| | | |
|---|---|---|
| JP | 2009-177815 A | 8/2009 |
| WO | 2012/000551 A1 | 1/2012 |
| WO | 2012/155971 A1 | 11/2012 |
| WO | 2013/142361 A1 | 9/2013 |

OTHER PUBLICATIONS

"EUTRAN topology in support of Home eNodeBs", Mitsubishi Electric, 3GPP TSG RAN WG3 Meeting #57, R3-071589, XP050162402, 2007, pp. 1-4.

3GPP TR 36.902, V9.3.0, Technical Report, 3rd Generation Partnership Project; Technical Specification Group Radio AY Access Network; Evolved Universal Terrestrial Radio Access Network (E-UTRAN); Self-configuring and self-optimizing network (SON) use cases and solutions, Release 9, (Dec. 2010), 21 Pages.

3GPP TS 36.420, V11 .0.0, Technical Specification, 3rd Generation Partnership Project; Technical Specification Group Radio Access Network; Evolved Universal Terrestrial Radio Access Network (E-UTRAN); X2 general aspects and principles, Release 11, (Sep. 2012), 12 Pages.

3rd Generation Partnership Project; Technical Specification Group Radio Access Network; Evolved Universal Terrestrial Radio Access Network (E-UTRAN): S1 general aspects and principles (Release 11 ), 3GPP TS 36.410 V11.1.0, XP050712300, 2013, pp. 1-15.

Wang Xi-Jun, et al. "Cell-Cluster Based Traffic Load Balancing in Cooperative Cellular Networks", Proceedings from the 7th IEEE Consumer Communications and Networking Conference (CCNC), XP031643012, 2010, pp. 1-5.

Extended European Search Report dated Jan. 24, 2018 in Patent Application No. 15819071.0 14 pages.

Extended Search Report issued in European Application 19186788. 8-1214 dated Oct. 28, 2019.

Coldrey, M., et al., "Small-Cell Wireless Backhauling: A Non-Line-of-Sight Approach for Point-to-Point Microwave Links", Vehicular Technology Conference (VTC Fall), 2012 IEEE, 5 Pages total, (Sep. 3, 2012).

Ericsson, "Support of Inter-eNB CoMP", 3GPP TSG RAN #63, RP-140265, 4 Pages total, (Mar. 3-6, 2014).

NEC Group, "Cell Selection on Dual Connectivity for Small Cells", 3GFP TSG RAN WG1 #73, R1-132337, 4 Pages total, (May 20-24, 2013).

* cited by examiner

APPARATUS FOR ROUTING TRAFFIC IN A PLURALITY OF CELL GROUPS EACH INCLUDING TWO OR MORE CELLS

CROSS-REFERENCE TO RELATED APPLICATIONS

This application is a continuation of U.S. patent application Ser. No. 15/316,962, filed Dec. 7, 2016 which is a National Stage Application based on PCT/JP2015/064206, filed May 15, 2015, and claims priority to Japanese application no. 2014-141234, filed Jul. 9, 2014; the entire contents of each of which are incorporated herein by reference.

TECHNICAL FIELD

The present disclosure relates to an apparatus for routing traffic in a plurality of cell groups each including two or more cells.

BACKGROUND ART

In 2002, the mobile phone service of the 3G system, called the third generation in Japan, started. At first, small-size packets were used for transmission or reception to perform voice calls and mail transmission. However, with the introduction of high-speed downlink packet access (HSDPA), it became possible to transmit and receive larger-size packets for downloading of music files or streaming of video. With such an increase of packet capacities, the service of long term evolution (LTE) in which orthogonal frequency division multiple access (OFDMA) is used on the downlink also started for the expansion on the side of the wireless network. In addition, the launch of 4G service is scheduled to be made in around 2015. Accordingly, up to one gigabit per second (Gbps) will be achieved in a semi-fixed environment and up to 100 Mbps will be achieved even in a mobile environment.

With the increase in traffic as described above, the congestion of traffic is expected to be prevented by arranging a small base station that is inexpensive and easy to install. Various techniques for preventing the congestion of traffic are developed.

In one example, Non-Patent Literature 1 (especially, "5.2.2 Load Management") discloses the exchange of traffic load information between eNBs such that the eNBs can control a traffic load appropriately. In one example, Non-Patent Literature 2 discloses the load balancing (e.g. change in handover parameters) based on the load information exchanged between eNBs.

CITATION LIST

Non-Patent Literature

Non-Patent Literature 1: 3GPP TS 36.420 V11.0.0 (September 2012) "3rd Generation Partnership Project; Technical Specification Group Radio Access Network; Evolved Universal Terrestrial Radio Access Network (E-UTRAN); X2 general aspects and principles (Release 11)"

Non-Patent Literature 2: 3GPP TR 36.902 V9.3.0 (December 2010) "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)"

DISCLOSURE OF INVENTION

Technical Problem

It is conceivable that a mechanism for centralized control of a network such as software-defined networking (SDN) is introduced even in a cellular system. In one example, a mechanism for routing control of OpenFlow can be introduced to cellular systems. In one example, routing corresponding to a traffic condition can be performed for each cell.

However, if the number of cells in a cellular system increases, a high load is likely to be imposed when a controller for performing the centralized control collects information relating to traffic of a cell. In one example, when many small cells are arranged in high density, the number of cells in the cellular system becomes is large significantly, and thus a very high load can occur.

Therefore, it is desirable to provide a mechanism capable of reducing a load on a controller configured to perform centralized control of a network.

Solution to Problem

According to the present disclosure, there is provided an apparatus including: an acquisition unit configured to acquire traffic information relating to traffic of a cell group including two or more cells; and a provision unit configured to provide the traffic information for a control device, the control device being configured to perform routing control of traffic of a plurality of cell groups including the cell group.

According to the present disclosure, there is provided an apparatus including: an acquisition unit configured to acquire traffic information provided by an information processing device for each of a plurality of cell groups each of which includes two or more cells, the traffic information relating to traffic of the cell group, the information processing, device being associated with the cell group; and a control unit configured to perform routing control of traffic of the plurality of cell groups based on the traffic information regarding each of the plurality of cell groups.

Advantageous Effects of Invention

According to the present disclosure as described above, it is possible to reduce the load on the controller configured to perform centralized control of a network. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
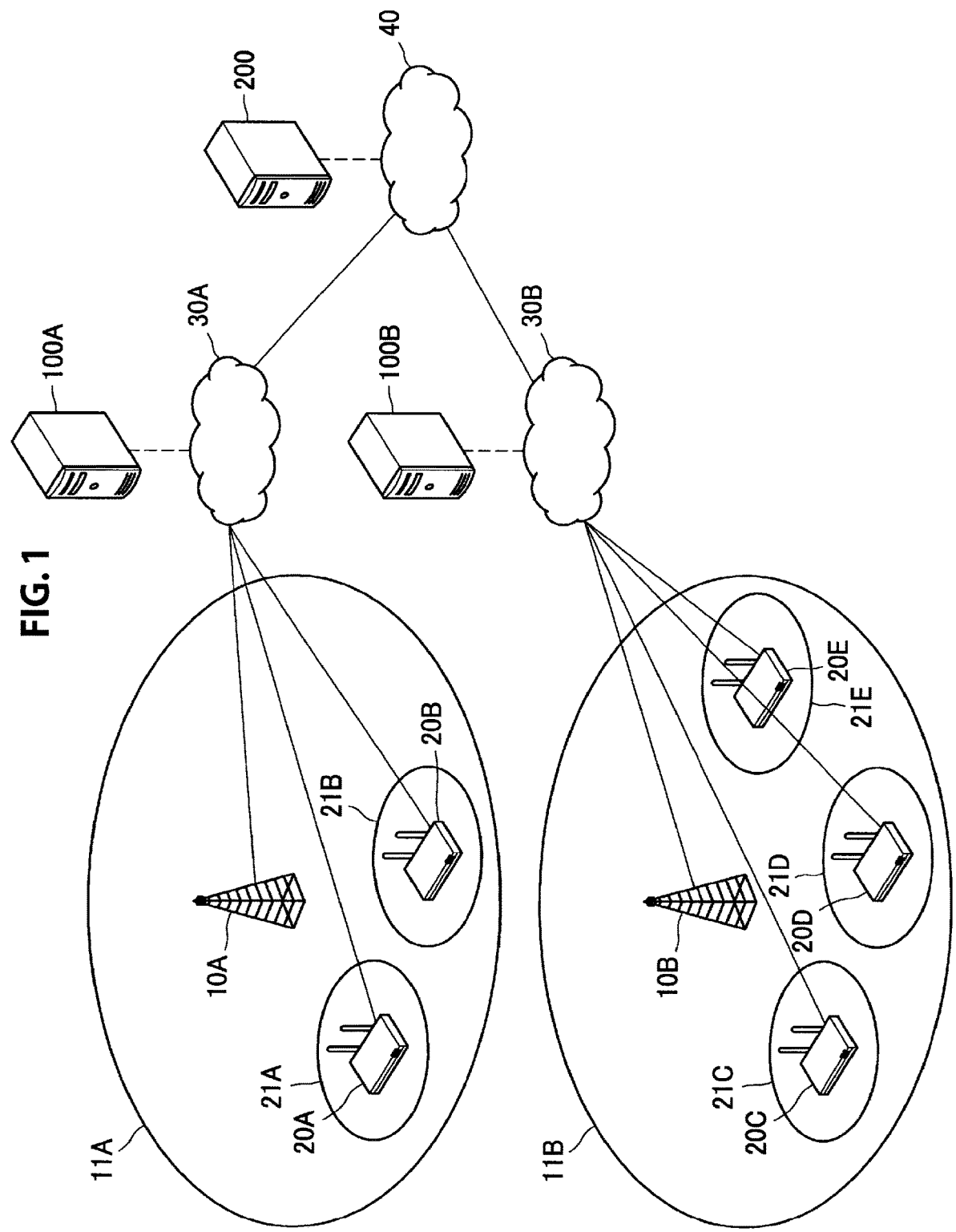
FIG. 1 is a diagram illustrated to describe an exemplary schematic configuration of a communication system according to the present embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In this specification and the drawings, components having substantially identical functional structure are sometimes distinguished by appending different alphabet characters following identical reference numerals. In one example, a plurality of components having substantially identical functional structure are distinguished in a similar way to base stations 10A, 10B, and 10C, if necessary. However, identical reference numerals are appended in a case where there is no particular significance to distinguish between a plurality of components having substantially identical functional structure. In one example, when there is no particular significance to distinguish among base stations 10A, 10B, and 10C, they are simply referred to as base station 10.

The description will be made in the following order.
1. Schematic Configuration of Communication System
2. Configuration of Information Processing Device
3. Configuration of Control Device
4. Processing Procedure
5. Application Examples
6. Conclusion <Schematic Configuration of Communication System>

A schematic configuration of a communication system 1 according to an embodiment of the present disclosure is now described with reference to FIG. 1. FIG. 1 is a diagram illustrated to describe an exemplary schematic configuration of the communication system 1 according to the present embodiment. Referring to FIG. 1, the communication system 1 includes a base station 10, a base station 20, a network 30, a network 40, an information processing device 100, and a control device 200.

(Base Station 10)

The base station 10 is a base station of a macrocell 11. In one example, the base station 10 performs wireless communication with a terminal device located in the macrocell 11. In one example, the base station 10 is connected to the network 30.

(Base Station 20)

The base station 20 is a base station of a small cell 21. In one example, the base station 20 performs wireless communication with a terminal device located in the small cell 21. In one example, the base station 20 is connected to the network 30.

In one example, the small cell 21 overlaps with the macrocell 11. More specifically, in one example, small cells 21A and 21B overlap with a macrocell 11A, and small cells 21C, 21D, and 21E overlap with a macrocell 11B.

The small cell 21 may be a cell defined by a terminal device that operates as a base station. In other words, the base station 20 may be a terminal device operating as a base station. More specifically, in one example, the operation mode of a terminal device may be capable of being set dynamically to a mobile station mode for operating as a mobile station or to a base station mode for operating as a base station. The base station 20 may be a terminal device whose operation mode is the base station mode. The terminal device may be connected to the network 30 via wireless backhaul between the terminal device and any one of base stations (e.g. the base station 10).

(Network 30)

The network 30 is a network to which a base station is connected. The network 30 is connected to a network 40.

The network 30 forwards traffic of a cell of a base station connected to the network 30. An example of the traffic includes traffic directed toward a terminal device (i.e., downlink traffic) and/or traffic directed from a terminal device (i.e., uplink traffic). Control information included in the traffic may be forwarded via the control plane, and other information may be forwarded via the data plane. The control plane may be separated physically or virtually from the data plane.

In one example, the network 30 forwards traffic between the network 40 and a base station connected to the network 30. In one example, the network 30 forwards traffic between base stations connected to the network 30.

In one example, the network 30 includes a network node such as a switch, a router, and/or a gateway. In one example, the network node is a network node that supports SDN or OpenFlow.

Networks 30A and 30B may be non-overlapping networks, or may be overlapped with each other partially or wholly.

(Network 40)

The network 40 is a network that is connected to the network 30 or other networks.

The network 40 forwards traffic of a cell of a base station connected to the network 30. An example of the traffic includes traffic directed toward a terminal device (i.e., downlink traffic) and/or traffic directed from a terminal device (i.e., uplink traffic). Control information included in the traffic may be forwarded via the control plane, and other information may be forwarded via the data plane. The control plane may be separated physically or virtually from the data plane.

In one example, the network 40 forwards traffic between the network 30 and the other networks. In one example, the network 40 forwards traffic between the networks 30.

In one example, the network 40 includes a network node such as a switch, a router, and/or a gateway. In one example, the network node is a network node that supports SDN or OpenFlow.

(Information Processing Device 100)

In an embodiment of the present disclosure, the information processing device 100 provides traffic information relating to traffic of a cell group including two or more cells for the control device 200. In one example, the two or more cells include the macrocell 11 and the small cell 21 that overlaps with the macrocell 11. In one example, the information processing device 100 collects the information relating to traffic from the base station 10 or the base station 20. The information processing device 100 includes the control plane that is used to exchange control information with the control device 200. The control plane may be separated physically or virtually from the data plane.

In one example, a first cell group includes the macrocell 11A, the small cell 21A, and the small cell 21B, and an information processing device 100A provides the traffic information relating to traffic of the first cell group for the control device 200. In one example, a second cell group includes the macrocell 11B, the small cell 21C, the small cell 21D, and the small cell 21E, and an information processing device 100B provides the traffic information relating to traffic of the second cell group for the control device 200. The traffic information may be provided as flow statistics of OpenFlow.

Although there is illustrated an example in which each of the cell groups includes one macrocell 11, the cell group according to an embodiment of the present disclosure is not limited thereto. In one example, the cell group may include two or more macrocells 11 (and the small cell 21 that overlaps with the macrocell 11 included in the two or more macrocells 11). Although there is illustrated an example in which each of the cell groups includes the macrocell 11 and the small cell 21, the cell group according to an embodiment of the present disclosure is not limited thereto. In one example, there may be a cell group including only two or more macrocells without including a small cell. There may be a cell group including only two or more small cells. The network 30 may be provided for each of the cell groups, or may be shared among the cell groups.

As one example, the information processing device 100 is connected to the network 30. In one example, the information processing device 100A is connected to the network 30A, and the information processing device 100B is connected to the network 30B. The information processing device 100 may be connected to another network (e.g. the network 40) rather than the network 30. Alternatively, the information processing device 100 may be a network node included in the network 30.

(Control Device 200)

In an embodiment of the present disclosure, the control device 200 performs routing control of traffic for each of a plurality of cell groups based on traffic information regarding each of the plurality of cell groups.

In one example, the control device 200 performs routing control of traffic for each of the first cell group and the second cell group based on traffic information regarding the first cell group and traffic information regarding the second cell group.

Although there is illustrated an example in which the plurality of cell groups are two cell groups (i.e., the first cell group and the second cell group), the present disclosure is not limited thereto. In one example, the plurality of cell groups may be three or more cell groups. In this case, the control device 200 may collect traffic information from three or more information processing devices 100.

As one example, the control device 200 is connected to the network 40. The control device 200 may be connected to another network (e.g. the network 30) rather than the network 40. Alternatively, the control device 200 may be a network node included in the network 40.

(Illustrative Example of Communication System 1)

In one example, the communication system 1 is a cellular system. In this case, in one example, the information processing device 100 and the control device 200 are core network nodes of the cellular system. Each of the information processing device 100 and the control device 200 may be existing core network nodes (e.g. mobility management entity (MME), serving gateway (S-GW), and packet data network (P-GW)), or may be a newly added core network node.

Alternatively, the information processing device 100 may be home evolved node B (HeNB-GW), and the control device 200 may be a core network node. Alternatively, the control device 200 may be HeNB-GW, and the information processing device 100 may be an auxiliary node of HeNB-GW.

2. CONFIGURATION OF INFORMATION PROCESSING DEVICE

Figure 2:
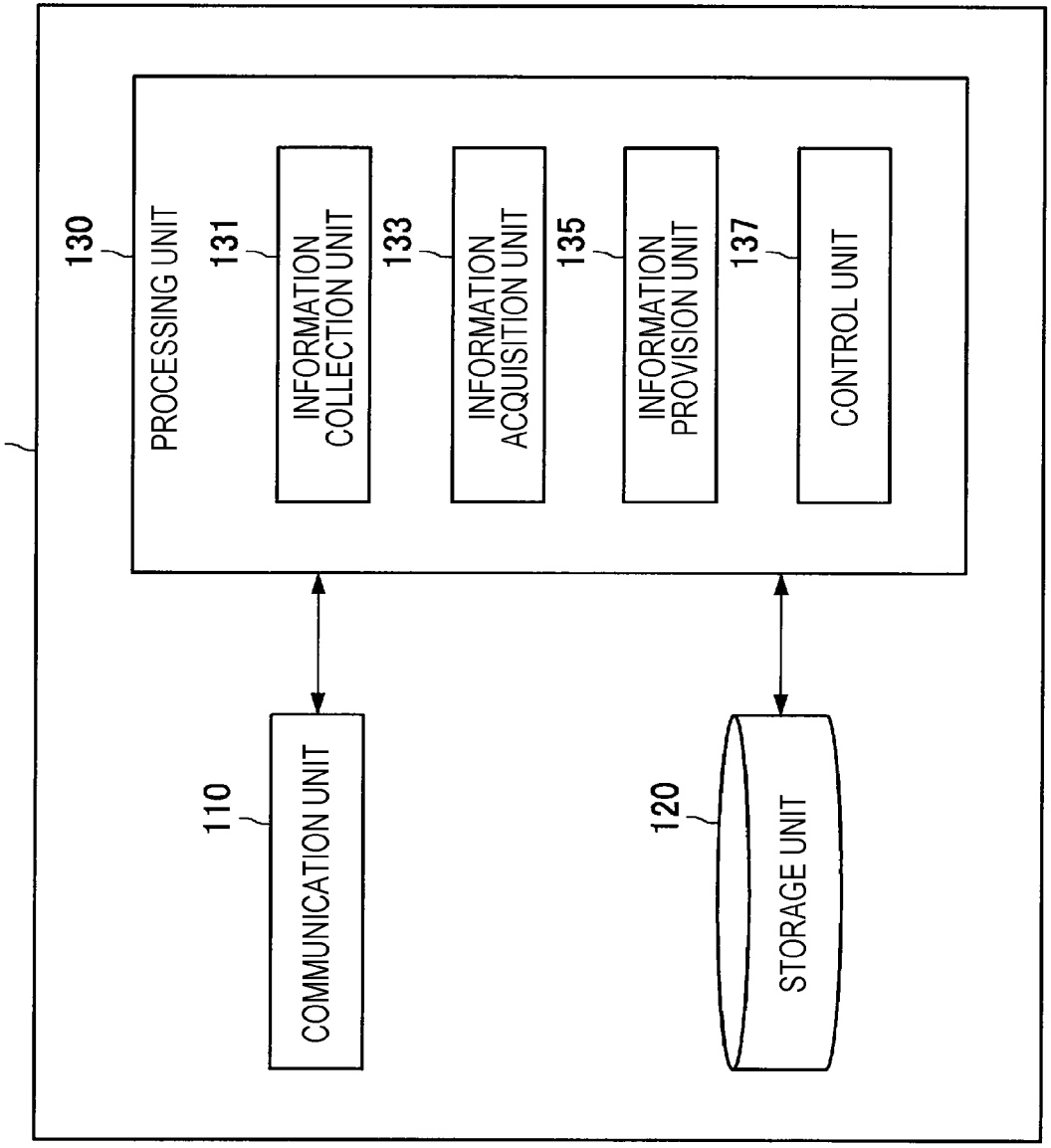
FIG. 2 is a diagram illustrated to describe an exemplary schematic configuration of an information processing device according to the present embodiment.

Subsequently, a schematic configuration of the information processing device 100 according to an embodiment of the present disclosure is now described with reference to FIGS. 2 to 7. FIG. 2 is a diagram illustrated to describe an exemplary schematic configuration of the information processing device 100 according to the present embodiment. Referring to FIG. 2, the information processing device 100 is configured to include a communication unit 110, a storage unit 120, and a processing unit 130.

(Communication Unit 110)

The communication unit 110 transmits and receives information. In one example, the communication unit 110 transmits information to another node and receives information from another node. An example of the other node includes the base station 10, the base station 20, and/or the control device 200.

(Storage Unit 120)

The storage unit 120 stores a program and data used for operations of the information processing device 100 on a temporary or permanent basis.

(Processing Unit 130)

The processing unit 130 enables the information processing device 100 to perform various functions. The processing unit 130 is configured to include an information collection unit 131, an information acquisition unit 133, an information provision unit 135, and a control unit 137. The processing unit 130 may further include other components than these components. In other words, the processing unit 130 may also perform other operations than operations of these components.

(Information Collection Unit 131)

The information collection unit 131 collects the information relating to traffic from a base station of one or more cells included in a cell group. The cell group includes two or more cells.

(a) Cell Group

The cell group is a cell group associated with the information processing device 100.

In one example, a cell group associated with the information processing device 100A is the first cell group (i.e., the cell group including the macrocell 11A and the small cells 21A and 21B). Thus, the information collection unit 131 of the information processing device 100A collects the information relating to traffic from base stations of one or more cells included in the first cell group.

In one example, a cell group associated with the information processing device 100B is the second cell group (i.e., the cell group including the macrocell 11B and the small cells 21C, 21D, and 21E). Thus, the information collection unit 131 of the information processing device 100B collects the information relating to traffic from base stations of one or more cells included in the second cell group.

(b) Cell Included in Cell Group

In one example, the two or more cells include the macrocell 11 and the small cell 21 that overlaps with the macrocell 11.

In one example, the small cell 21 may include a cell defined by a terminal device operating as a base station.

The two or more cells may include only the macrocell 11. Alternatively, the two or more cells may include only the small cell 21.

(c) Collection from Base Station of One or More Cells

In one example, the information collection unit 131 collects the information relating to traffic from the base station 10 of the macrocell 11 included in the cell group. In this case, in one example, the information relating to traffic is information relating to traffic of the macrocell 11 and the small cell 21 that overlaps with the macrocell 11. On this point, an illustrative example is described below with reference to FIG. 3.

Figure 3:
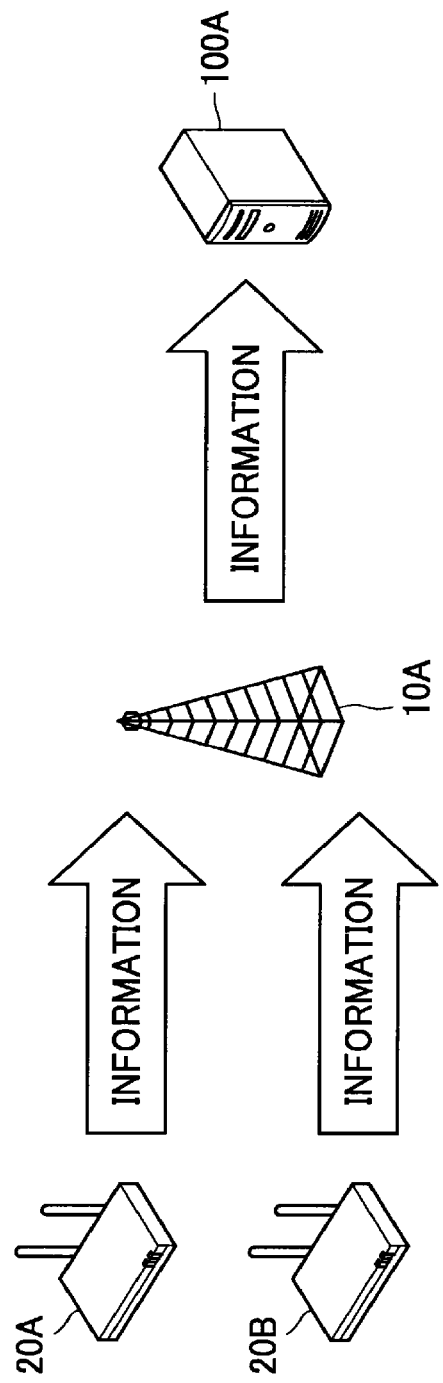
FIG. 3 is a diagram illustrated to describe a first example in which the information processing device collects information relating to traffic.

FIG. 3 is a diagram illustrated to describe a first example in which the information processing device 100 collects information relating to traffic. Referring to FIG. 3, there are illustrated the information processing device 100A, the base station 10A of the macrocell 11A, the base station 20A of the small cell 21A, and the base station 20B of the small cell 21B. The base station 20A reports the information relating to traffic of the small cell 21A to the base station 10A, and the base station 20B reports the information relating to traffic of the small cell 21B to the base station 10A. Then, the base station 10A reports the information relating to traffic of the macrocell 11A, the small cell 21A, and the small cell 21B to the information processing device 100A. In one example, the information relating to traffic of the macrocell 11A, the small cell 21A, and the small cell 21B includes information relating to traffic of each cell. In other words, the information relating to traffic of the macrocell 11A, the small cell 21A, and the small cell 21B includes information relating to traffic of the macrocell 11A, information relating to traffic of the small cell 21A, and information relating to traffic of the small cell 21B. Alternatively, the information relating to traffic of the macrocell 11A, the small cell 21A, and the small cell 21B may be information relating to traffic of all the macrocell 11A, the small cell 21A, and the small cell 21B. In this case, the base station 10A may generate the information relating to traffic of all the macrocell 11A, the small cell 21A, and the small cell 21B, based on the information relating to traffic of the macrocell 11A, the information relating to traffic of the cell 21A, and the information relating to traffic of the cell 21B.

The information collection unit 131 may collect the information relating to traffic from a base station of each cell included in the cell group. On this point, an illustrative example is described below with reference to FIG. 4.

Figure 4:
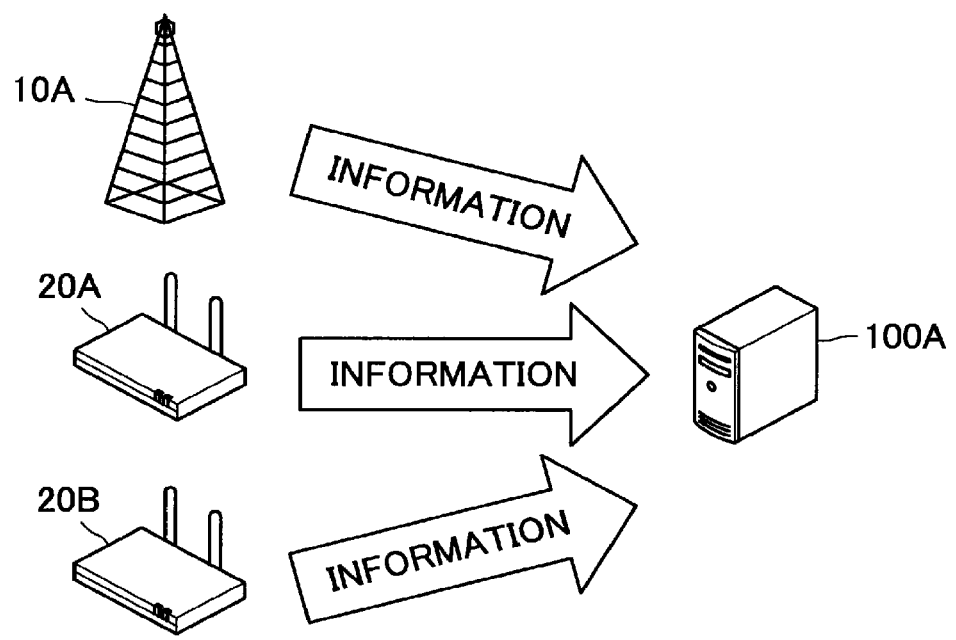
FIG. 4 is a diagram illustrated to describe a second example in which the information processing device collects information relating to traffic.

FIG. 4 is a diagram illustrated to describe a second example in which the information processing device 100 collects information relating to traffic. Referring to FIG. 4, there are illustrated the information processing device 100A, the base station 10A, the base station 20A, and the base station 20B. The base station 10A may report the information relating to traffic of the macrocell 11A to the information processing device 100A. The base station 20A may report the information relating to traffic of the small cell 21A to the information processing device 100A. The base station 20B may report the information relating to traffic of the small cell 21B to the information processing device 100A.

Although the example described above illustrates an example in which the cell group includes one macrocell 11, an embodiment of the present disclosure is not limited thereto. The cell group may include two or more macrocells 11. On this point, an illustrative example is described below with reference to FIG. 5.

Figure 5:
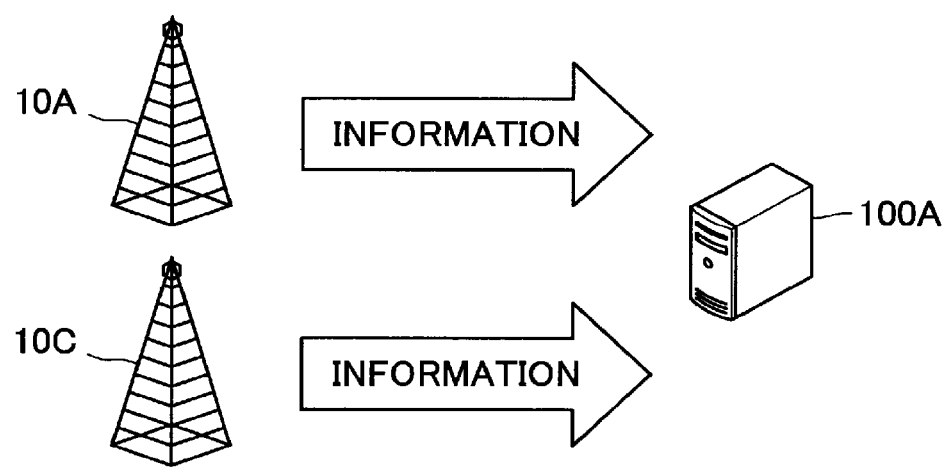
FIG. 5 is a diagram illustrated to describe a third example in which the information processing device collects information relating to traffic.

FIG. 5 is a diagram illustrated to describe a third example in which the information processing device 100 collects information relating to traffic. Referring to FIG. 5, there are illustrated the information processing device 100A, the base station 10A, and a base station 10C. In one example, the cell 11A of the base station 10A and a cell 11C of the base station 10C may be included in the first cell group associated with the information processing device 100. The base station 10A and the base station 10C may report the information relating to traffic to the information processing device 100A.

(d) Information Relating to Traffic (d-1) Traffic

In one example, the traffic includes the traffic directed toward a terminal device (i.e., downlink traffic) and/or the traffic directed from a terminal device (i.e., uplink traffic).

In one example, the traffic is traffic that is processed (in one example, in a given period of time) by a base station of a cell. Alternatively, the traffic may be traffic that is intended to be processed later (in one example, in a given period of time) by a base station of a cell.

(d-2) Illustrative Example of Information

As one example, the information relating to traffic is information indicating the amount of traffic (e.g. total amount, average value, etc.). As another example, the information relating to traffic may be information that indicates the history of the amount of traffic. As still another example, the information relating to traffic may be statistics of the amount of traffic or may be converted into a format defined as flow statistics of OpenFlow. As still yet another example, the information relating to traffic may be information regarding the number of control information items.

(e) Specific Operation

(e-1) Request

In one example, the information collection unit 131 requests a base station of one or more cells included in the cell group to report the information relating to traffic.

Request to Base Station of One or More Cells

In one example, the information collection unit 131 requests a base station of a macrocell included in the cell group to report the information relating to traffic. More specifically, in one example, the information collection unit 131 of the information processing device 100A requests the base station 10A of the macrocell 11A to report the information relating to traffic. Then, the base station 10A requests the base station 20 of the small cell 21 that overlaps with the macrocell 11A (i.e., the base station 20A of the small cell 21A and the base station 20B of the small cell 21B) to report the information relating to traffic. Thus, the information relating to traffic is reported as described with reference to FIG. 3 or FIG. 4.

Alternatively, the information collection unit 131 may request a base station of each cell included in the cell group to report the information relating to traffic. More specifically, in one example, the information collection unit 131 of the information processing device 100A may request the base station 10A of the macrocell 11A, the base station 20A of the small cell 21A, and the base station 20B of the small cell 21B to report the information relating to traffic. Thus, the information relating to traffic may be reported, as described with reference to FIG. 3 or FIG. 4.

Specific Operation

In one example, the information collection unit 131 transmits a message for requesting the report to a base station of the one or more cells via the communication unit 110. As one example, the message is referred to as a resource status request message. The message may be referred to by different names understandably.

The information processing device 100 may transmit the message in unicast, multicast, or broadcast mode. The base station 10 also may transmit the message in unicast, multicast, or broadcast mode.

Request Timing

In one example, the information collection unit 131 requests the report from the base station of the one or more cells in response to the occurrence of an event. As one example, the event is triggered when there is a request from the control device 200. In other words, the information collection unit 131 requests the report in response to a request from the control device 200.

The information collection unit 131 may request the report periodically from the base station of the one or more cells.

As described above, the information collection unit 131 requests the base station of the one or more cells included in the cell group to report the information relating to traffic, in one example. This allows the information processing device 100 to collect the information relating to traffic if necessary, in one example. Instead of the report being requested by the information collection unit 131, the report may be performed independently by the base station of the one or more cells included in the cell group.

(e-2) Provision of Report Condition Information

The information collection unit 131 provides information indicating a condition for reporting the information relating to traffic (referred to as "report condition information" hereinafter) for the base station of the one or more cells included in the cell group.

Provision for Base Station of One or More Cells

In one example, the information collection unit 131, when requesting the base station of the one or more cells included in the cell group to report the information relating to traffic, provides the report condition information for the base station of the one or more cells. As one example, the report condition information includes a message for requesting the report.

Report Condition Information

The report condition information is information relating to timing of the report. Alternatively, the report condition information includes information relating to the timing of the report.

In one example, the report condition information indicates whether the report is a report performed periodically or a report performed in response to the occurrence of an event.

In one example, when the report is a report performed periodically, the report condition information indicates a period of the report.

In one example, when the report is a report performed in response to the occurrence of an event, the report condition information includes information relating to the event. As one example, the event is triggered when a change in the amounts of traffic within a period of time exceeds a threshold, which is indicated by the report condition information. The report condition information may indicate the period of time.

As described above, the report condition information is provided, in one example. This allows the information processing device 100 to collect the information relating to traffic under a desired condition.

(Information Acquisition Unit 133)

The information acquisition unit 133 acquires traffic information relating to traffic of the cell group.

(a) Traffic

In one example, the traffic includes the traffic directed toward a terminal device (i.e., downlink traffic) and/or the traffic directed from a terminal device (i.e., uplink traffic).

In one example, the traffic is traffic that is processed (in one example, in a given period of time) by a base station of a cell. Alternatively, the traffic may be traffic that is intended to be processed later (in one example, in a given period of time) by a base station of a cell. The traffic may be defined as the amount of data in the data plane, the number of packets, or a flow in OpenFlow. The traffic may be the amount of data included in the control information in the control plane, or may be the number of control information items.

The traffic may be all the traffic, or may be traffic other than traffic completed in the cell group (i.e., traffic directed outside the cell group and traffic directed inside the cell group).

(b) Traffic Information

(b-1) Information Granularity

First Example (Each Cell)

In a first example, the traffic information includes information relating to traffic of each cell included in the cell group.

In one example, the first cell group associated with the information processing device 100A includes the macrocell 11A, the small cell 21A, and the small cell 21B. Thus, the traffic information relating to traffic of the first cell group includes information relating to traffic of the macrocell 11A, information relating to traffic of the small cell 21A, and information relating to traffic of the small cell 21B.

In one example, the second cell group associated with the information processing device 100B includes the macrocell 11B, the small cell 21C, the small cell 21D, and the small cell 21E. Thus, the traffic information relating to traffic of the second cell group includes information relating to traffic of the macrocell 11B, information relating to traffic of the small cell 21C, information relating to traffic of the small cell 21D, and information relating to traffic of the small cell 21E.

Second Example (Whole of Cell Group)

In a second example, the traffic information may be information relating to traffic of the whole of the cell group.

In one example, the first cell group associated with the information processing device 100A includes the macrocell 11A, the small cell 21A, and the small cell 21B. Thus, the traffic information relating to traffic of the first cell group includes information relating to traffic of all of the macrocell 11A, the small cell 21A, and the small cell 21B. In this case, the information processing device 100 (e.g. the processing unit 130) may generate the information relating to traffic of all of the macrocell 11A, the small cell 21A, and the small cell 21B. This is performed based on the information relating to traffic of the macrocell 11A, the information relating to traffic of the small cell 21A, and the information relating to traffic of the small cell 21B.

In one example, the second cell group associated with the information processing device 100B includes the macrocell 11B, the small cell 21C, the small cell 21D, and the small cell 21E. Thus, the traffic information relating to traffic of the second cell group may be information relating to traffic of all of the macrocell 11B, the small cell 21C, the small cell 21D, and the small cell 21E. In this case, the information processing device 100 (e.g. the processing unit 130) may generate the information relating to traffic of all of the macrocell 11B, the small cell 21C, the small cell 21D, and the small cell 21E. This is performed based on the information relating to traffic of the macrocell 11B, the information relating to traffic of the small cell 21C, the information relating to traffic of the small cell 21D, and the information relating to traffic of the small cell 21E.

(b-2) Illustrative Example of Information

As one example, the traffic information is information indicating the amount of traffic (e.g. total amount, average value, etc.). As another example, the traffic information may be information indicating the history of the amount of traffic. As still another example, the traffic information may be statistics of the amount of traffic or may be converted into a format defined as flow statistics of OpenFlow. As yet another example, the information relating to traffic may be information regarding the number of control information items.

(c) Specific Operation

In one example, the information relating to traffic that is collected by the information collection unit 131 is stored in the storage unit 120 as the traffic information. The information acquisition unit 133 acquires the traffic information from the storage unit 120 at any subsequent timing.

Alternatively, the information relating to traffic that is collected by the information collection unit 131 is stored in the storage unit 120 as the traffic information, and the traffic information may be generated by the processing unit 130 based on the information stored in the storage unit 120 and their may be stored in the storage unit 120. The information acquisition unit 133 may acquire the traffic information from the storage unit 120 at any subsequent timing.

When the information relating to traffic that is collected by the information collection unit 131 or the traffic information includes the information relating to traffic of each cell, the information relating to traffic of each cell may be stored together with identification information of a cell or a base station (e.g. a cell ID).

(Information Provision Unit 135)

The information provision unit 135 provides the traffic information for the control device 200 configured to perform routing control of traffic of a plurality of cell groups including the cell group described above.

In one example, the information provision unit 135 provides the traffic information for the control device 200 in response to a request from the control device 200.

The information collection unit 131, the information provision unit 135 may provide the traffic information for the control device 200 independently. As one example, the information provision unit 135 may provide periodically the traffic information for the control device 200.

As described above, the traffic information relating to traffic of the cell group is provided for the control device 200, in one example. This makes it possible to reduce the load on the controller (i.e., the control device 200) configured to perform centralized control of a network, in one example. More specifically, in one example, the control device 200 is provided with the traffic information relating to the traffic of the cell group by the information processing device 100 associated with the cell group for each cell group. Thus, the load necessary to collect the traffic information is distributed between the control device 200 and the information processing device 100. Accordingly, the load on the control device 200 can be reduced.

In one example, when a large number of small cells are arranged in high density or when a small cell is arranged dynamically by operating a terminal device as a base station, the number of cells in the cellular system is likely to increase significantly. In such a case, the load necessary to collect the traffic information is distributed between the control device 200 and the information processing device 100, and thus the load imposed on the control device 200 can be reduced.

Control Unit 137

(a) Routing Control

In one example, the control unit 137 performs routing control of traffic of the cell group. This makes it possible to reduce the load on the controller (i.e., the control device 200) performing centralized control of a network in view of the routing control.

(a-1) Sharing of Roles Between Information Processing Device 100 and Control Device 200

Routing Control Performed by Information Processing Device 100

In one example, the routing control performed by the information processing device 100 (the control unit 137) is control of the routing in a network associated with the cell group. The network includes a base station for each cell included in the cell group.

In one example, the first cell group includes the macrocell 11A, the small cell 21A, and the small cell 21B. A first network associated with the first cell group includes the base station 10A, the base station 20A, the base station 20B, and the network 30A. The information processing device 100A associated with the first cell group performs the routing control in the first network.

In one example, the second cell group includes the macrocell 11B, the small cell 21C, the small cell 21D, and the small cell 21E. A second network associated with the second cell group includes the base station 10B, the base station 20C, the base station 20D, the base station 20E, and the network 30B. The information processing device 100B associated with the second cell group performs the routing control in the second network.

Routing Control Performed by Control Device 200

In one example, the routing control performed by the control device 200 is control of the routing in a network other than a network associated with each of the plurality of cell groups.

In one example, the plurality of cell groups include the first cell group and the second cell group. In this case, the network other than a network associated with each of the plurality of cell groups is a network other than the first network and the second network, and specifically, is the network 40, in one example. The control device 200 performs the routing control in the network 40.

(a-2) Selection of Base Station Through which Traffic Travels

In one example, the routing control performed by the control unit 137 includes selecting a base station through which the traffic regarding a terminal device located in a cell included in the cell group travels. In other words, the control unit 137 selects a base station through which the traffic regarding a terminal device located in a cell included in the cell group travels.

Traffic

In one example, the traffic includes the traffic directed toward the terminal device (i.e., downlink traffic) and/or the traffic directed from the terminal device (i.e., uplink traffic).

Base Station of Macrocell and Base Station of Small Cell

In one example, the control unit 137 selects a base station through which the traffic regarding a terminal device located in the macrocell 11 and the small cell 21 included in the cell group travels (i.e., the base station 10 of the macrocell 11 or the base station 20 of the small cell 21). On this point, an illustrative example is described below with reference to FIGS. 6 and 7.

Figure 6:
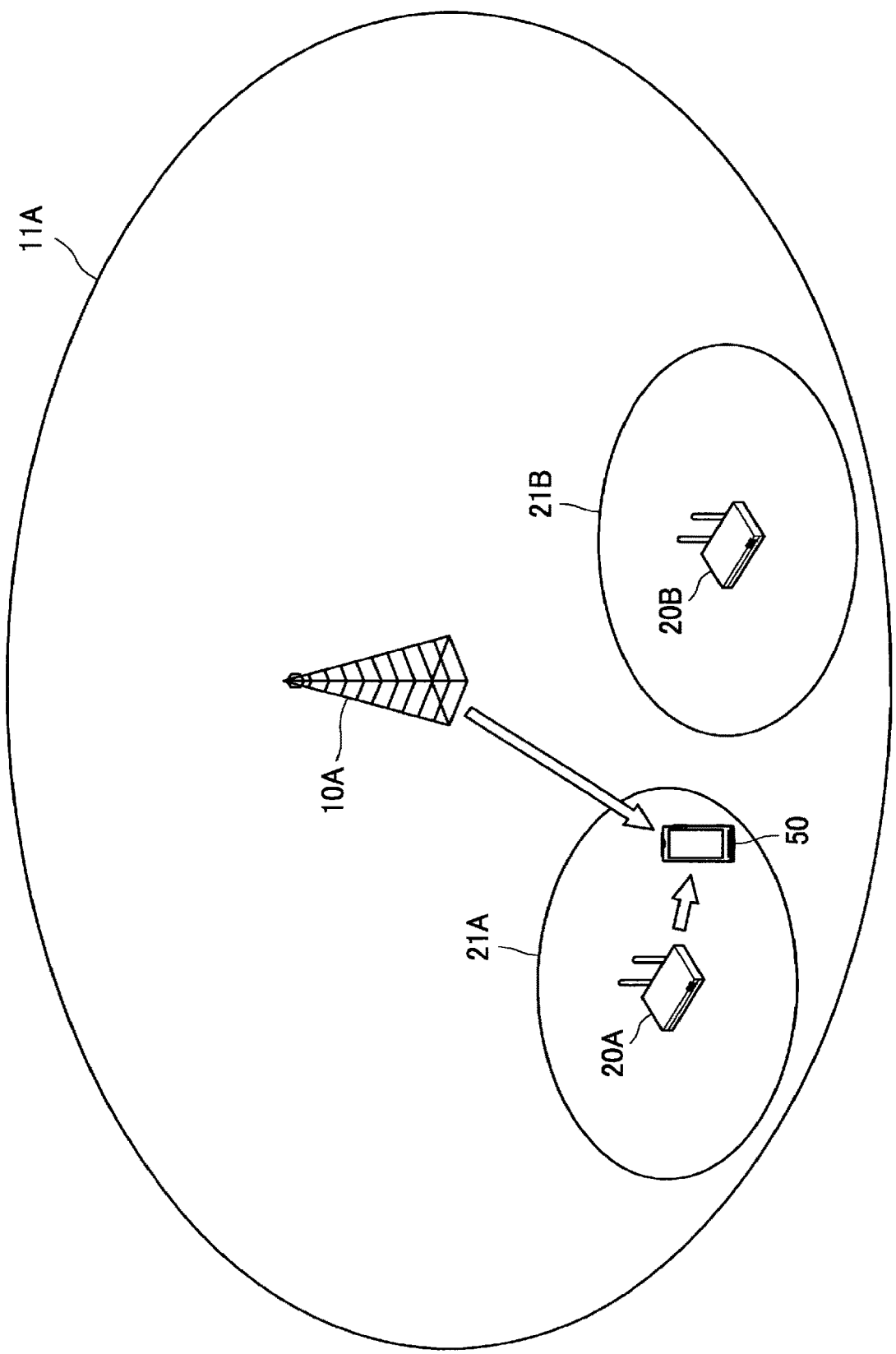
FIG. 6 is a diagram illustrated to describe an example of a base station through which downlink traffic travels.

FIG. 6 is a diagram illustrated to describe an example of a base station through which downlink traffic travels. Referring to FIG. 6, there are illustrated the base station 10A of the macrocell 11A, the base station 21A of the small cell 21A, and the base station 21B of the small cell 21B. Furthermore, a terminal device 50 located in the macrocell 11A and the small cell 21A is illustrated. In one example, the control unit 137 selects the base station 10A or the base station 20A as a base station through which the traffic directed toward the terminal device 50 (i.e., downlink traffic) travels. When the coordinated multipoint (CoMP) transmission is performed, the control unit 137 may select both the base station 10A and the base station 20B. The routing control may include a process pertaining to the scheduling for mapping information to a resource block in the frequency base direction and time base direction.

Figure 7:
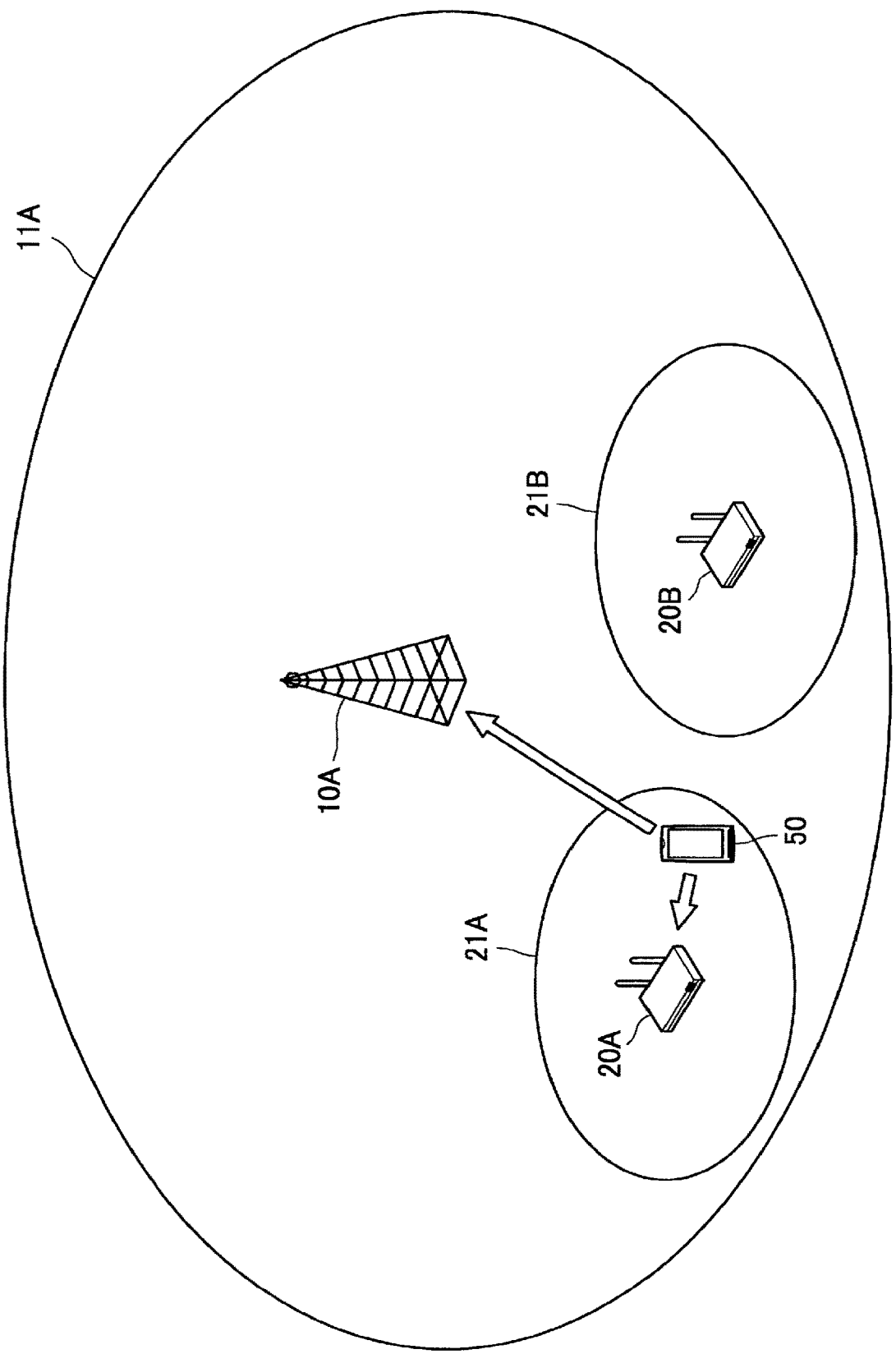
FIG. 7 is a diagram illustrated to describe an example of a base station through which uplink traffic travels.

FIG. 7 is a diagram illustrated to describe an example of a base station through which the uplink traffic travels. Referring to FIG. 7, there are illustrated the base station 10A, the base station 21A, the base station 21B, and the terminal device 50, which is similar to FIG. 6. In one example, the control unit 137 selects the base station 10A or the base station 20A as a base station through which the traffic directed from the terminal device 50 (i.e., uplink traffic) travels. When the coordinated multipoint (CoMP) transmission is performed, the control unit 137 may select both the base station 10A and the base station 20B. The routing control may include a process pertaining to the scheduling for mapping information to a resource block in the frequency base direction and time base direction.

Information used for Selection of Base Station

Channel Quality

In one example, the control unit 137 selects a base station through which the traffic regarding the terminal device travels based on information relating to the channel quality of a cell included in the cell group (referred to as "channel quality information" hereinafter). In one example, the channel quality is channel quality for the terminal device.

More specifically, in one example, the control unit 137 selects a base station of a cell having more favorable channel quality (or a cell having the most favorable channel quality) for the terminal device as the base station through which the traffic regarding the terminal device travels.

Referring again to FIG. 6, in one example, the channel quality in the downlink of the small cell 21A for the terminal device 50 is more favorable than the channel quality in the downlink of the macrocell 11A for the terminal device 50. Thus, the control unit 137 selects the base station 20A of the small cell 21A as the base station through which the traffic directed toward the terminal device 50 (i.e., downlink traffic) travels.

Referring again to FIG. 7, in one example, the channel quality in the uplink of the small cell 21A for the terminal device 50 is more favorable than the channel quality in the uplink of the macrocell 11A for the terminal device 50. Thus, the control unit 137 selects the base station 20A of the small cell 21A as the base station through which the traffic directed toward the terminal device 50 (i.e., uplink traffic) travels.

In one example, the channel quality information is provided for the information processing device 100 by the base station of the cell included in the cell group. The base station may provide the channel quality information for the information processing device 100 periodically, or may provide the channel quality information for the information processing device 100 in response to the occurrence of an event. As one example, the base station may provide the channel quality information for the information processing device 100 in response to a request from the information processing device 100 (the processing unit 130).

Alternatively, the channel quality information may be provided for the information processing device 100 via a base station by a terminal device located in a cell included in the cell group. The terminal device may provide the channel quality information for the information processing device 100 periodically, or may provide the channel quality information for the information processing device 100 in response to the occurrence of an event. As one example, the terminal device may provide the channel quality information for the information processing device 100 in response to a request from the information processing device 100 (the processing unit 130). The request may be performed by transmission of an RRC connection reconfiguration (radio resource control (RRC) connection) message. The measurement configuration may be set in the terminal device. The setup configuration includes measurement objects, reporting configurations, measurement identities, and measurement gaps. The channel quality information may include reference signal received power (RSRP), reference signal received quality (RSRQ), channel quality indicator (CQI), and signal to interference and noise ratio (SINR). The channel quality information may include effective communication speed, and the average information amount and average coding rate per symbol. The average information amount and average coding rate per symbol may be acquired from a base station that transmits and receives data to and from the terminal device using any multi-value modulation scheme at any coding rate.

As described above, the control unit 137 selects the base station through which the traffic regarding the terminal device travels based on the channel quality information, in one example. This makes it possible to allow the traffic regarding the terminal device to travel through a base station of a cell having more favorable channel quality for the terminal device, in one example. Consequently, the capacity of the traffic in the cell group can increase. Alternatively, the radio resource in the cell group can be used effectively. Moreover, the transmission delay of the traffic can be reduced.

Traffic

The control unit 137 may select the base station through which the traffic regarding the terminal device travels based on information relating to traffic of a cell included in the cell group.

More specifically, the control unit 137 may select a base station of a cell having a lower traffic load as the base station through which the traffic regarding the terminal device travels. The traffic load may be a degree of traffic load for the cell. As one example, it may be a ratio of the traffic amount to the bandwidth of a frequency band of the cell.

Referring again to FIG. 6, in one example, the traffic load of the downlink of the small cell 21A is lower than the traffic load of the downlink of the macrocell 11A. Thus, the control unit 137 may select the base station 20A of the small cell 21A as the base station through which the traffic directed toward the terminal device 50 (i.e., downlink traffic) travels.

Referring again to FIG. 7, in one example, the traffic load of the uplink of the small cell 21A is lower than the traffic load of the uplink of the macrocell 11A. Thus, the control unit 137 may select the base station 20A of the small cell 21A as the base station through which the traffic directed from the terminal device 50 (i.e., uplink traffic) travels.

The information relating to traffic of a cell included in the cell group may be information collected by the information collection unit 131, in one example. The traffic load may be calculated based on the information collected by the information collection unit 131 and information relating to the frequency band of a cell included in the cell group (e.g. information indicating the bandwidth or the like). The information relating to the frequency band may be known to the information processing device 100 or may be provided for the information processing device 100 by a base station.

Alternatively, the information relating to traffic of a cell included in the cell group may be information indicating the traffic load and may be provided for the information processing device 100 by a base station.

As described above, the control unit 137 selects the base station through which the traffic regarding the terminal device travels based on the information relating to traffic of a cell included in the cell group, in one example. This makes it possible to allow the traffic regarding the terminal device to travel through a base station of a cell having a low traffic load for the terminal device, in one example. Consequently, the traffic load in the cell group can be leveled. In other words, the load on the base station can be distributed. The transmission delay of the traffic can be reduced.

Selection Based on Different Types of Information

The control unit 137 may select the base station through which the traffic regarding the terminal device travels for each group of traffic (or for each packet or for each packet set). In one example, for a first group of traffic, the control unit 137 may select the base station through which the traffic regarding the terminal device travels based on the channel quality information. For a second group of traffic, the control unit 137 may select the base station through which the traffic regarding the terminal device travels based on the information relating to traffic of a cell included in the cell group. The traffic may be classified into groups of traffic depending on the quality of service (QoS) of the traffic. In other words, the QoS of traffic may be different between groups of traffic. The control unit 137 may perform control for selecting a particular base station for a group of traffic of a particular QoS. Furthermore, the control unit 137 holds information concerning the threshold such as traffic, channel quality information, and/or QoS, and may select the base station based on the information concerning the threshold. The information concerning the threshold may be updated dynamically by the control device 200.

(a-3) Control of Network Node

In one example, the routing control performed by the control unit 137 includes controlling a network node configured to forward the traffic of the cell group. In other words, the control unit 137 controls the network node configured to forward the traffic of the cell group.

In one example, the network node includes a network node included in the network 30 (e.g. a switch, a router, and/or a gateway). In one example, the control unit 137 controls the network node included in the network 30 so that the network node may forward the traffic regarding the terminal device to the base station selected as described above. More specifically, in one example, the control unit 137 transmits control information indicating a forwarding destination to the network included in the network 30 via the communication unit 110. Thus, the network node forwards the traffic regarding the terminal device based on the control information. In this regard, the network node may distinguish between traffic streams (in other words, groups of traffic) having different forwarding destinations in units of frames, packets, or segments. More specifically, the network node may distinguish between traffic streams having different forwarding destinations based on any one or a combination of IP address, MAC address, port number, protocol, application type, and identification information of a base station (e.g. IP address of eNodeB, physical cell identity (PCI), and E-UTRAN cell global identifier (ECGI)). Furthermore, the network node may be a termination node of tunneling (e.g. general packet radio (GTP) service tunnelling protocol), or may distinguish between traffic streams having different forwarding destinations based on the IP address allocated to the termination node (e.g. tunnelling end ID (TEID)) or a bearer ID. The control unit 137 may perform control of setup, modification, or release of a bearer between the terminal device and the network node serving as a forwarding destination for each of the traffic streams having different forwarding destinations (in other words, groups of traffic).

In one example, the network node includes a base station of a cell included in the cell group (e.g. the base station 10 and the base station 20). In one example, the control unit 137 controls the base station selected as described above so that the selected base station may allocate an uplink resource to the terminal device. More specifically, in one example, the control unit 137 transmits control information indicating the allocation of an uplink resource to the terminal device to the selected base station via the communication unit 110. Consequently, the selected base station allocates the uplink resource to the terminal device based on the control information. The control unit 137 may transmit control information indicating the allocation of a downlink resource to the terminal device to the selected base station, which is similar to the case of the uplink resource.

This makes it possible to perform centralized control of forwarding traffic of the cell group.

(b) Control of Frequency Band for Cell

The control unit 137 may control a frequency band and/or maximum transmission power for a cell included in the cell group.

In one example, the control unit 137 may control the frequency band or the maximum transmission power based on information relating to traffic of a cell included in the cell group.

As one example, the control unit 137 may allocate the frequency band to each of the macrocell 11 and the small cell 21 based on the amount of traffic (or the traffic load) for each of the macrocell 11 and the small cell 21. In one example, the amount of traffic of the macrocell 11 is small and the amount of traffic of the small cell 21 is large (or, the traffic load of the macrocell 11 is low and the traffic load of the small cell 21 is high). In this case, it may be possible to reduce the frequency band to be allocated to the macrocell 11 and to increase the frequency band to be allocated to the small cell 21. This makes it possible to adjust the amount of radio resource that can be used for a cell depending on the increase or decrease of traffic in the cell.

As another example, the control unit 137 may determine the maximum transmission power for each of the macrocell 11 and the small cell 21 based on the amount of traffic (or the traffic load) for each of the macrocell 11 and the small cell 21. In one example, the amount of traffic of the macrocell 11 is small and the amount of traffic of the small cell 21 is large (or, the traffic load of the macrocell 11 is low and the traffic load of the small cell 21 is high). In this case, it may be possible to reduce the maximum transmission power for the macrocell 11 and to increase the maximum transmission power for the small cell 21. This makes it possible to adjust the communication quality of a cell depending on the increase or decrease of traffic in the cell.

As still another example, the control unit 137 may determine the maximum transmission power for each of the macrocell 11 and the small cell 21 so that the interference between the macrocell 11 and the small cell 21 may be less than or equal to an allowable level. This makes it possible to use the same radio resource in both the macrocell 11 and the small cell 21.

The control unit 137 may notify information indicating the allocated frequency band and/or the determined maximum transmission power to a base station of a cell (e.g. the base station 10 and/or the base station 20) via the communication unit 110.

As described above, the control unit 137 may control the frequency band and/or the maximum transmission power for a cell included in the cell group, in one example. This makes it possible to increase the capacity of the traffic in the cell group, in one example. Alternatively, the radio resource in the cell group can be used effectively.

The control unit 137 may control the frequency band and/or the maximum transmission power based on a result of the routing control by the control unit 137.

(c) Control of Operation Mode in Base Station

The control unit 137 may control switching between operation modes of a base station of a cell included in the cell group. The switching may include switching between operation modes from one of a first mode and a second mode to the other. The first mode may be a mode in which wireless communication with a terminal device can be performed (referred to as "active mode" hereinafter). The second mode may be a mode in which the power consumption is lower than that of the first mode (referred to as "sleep mode" hereinafter). In other words, the control unit 137 may control the switching between the operation modes from one of the active mode and the sleep mode to the other.

As a specific process, the control unit 137 may transmit control information indicating the switching to a base station via the communication unit 110.

The control unit 137 may control the switching based on the information relating to traffic of a cell included in the cell group. As one example, when there is no more traffic of a cell, the control unit 137 may control the switching between the operation modes so that the operation mode of a base station of the cell may be switched from the active mode to the sleep mode. As another example, when the traffic of the macrocell 11 increases, the control unit 137 may control the switching between operation modes so that the operation mode of the base station 20 of the small cell 21 may be switched from the sleep mode to the active mode. In other words, the control unit 137 can control the switching between the operation modes of a base station of the cell depending on the traffic that varies dynamically.

This makes it possible to reduce the power consumption in the cell group, in one example.

The control unit 137 may further control the switching between operation modes of a terminal device that can operate as a mobile station and a base station. The switching may include switching between operation modes from one mode of a mobile station mode (i.e., a mode for operating as a mobile station) and a base station mode (i.e., a mode for operating as a base station) to the other mode. The control unit 137 may control the switching between the operation modes of a high-order terminal device based on the information relating to traffic of a cell included in the cell group. As one example, when there is no more traffic of a cell of a terminal device whose operation mode is the base station mode, the control unit 137 may control the switching between the operation modes of the terminal device so that the operation mode of the terminal device may be switched from the base station mode to the mobile station mode. As another example, when the traffic of the macrocell 11 increases, the control unit 137 may control the switching between the operation modes of the terminal device located in the macrocell 11 so that the operation mode of the terminal device may be switched from the mobile station mode to the base station mode. This makes it possible to increase or decrease the number of base stations depending on the increase or decrease of traffic, in one example.

3. CONFIGURATION OF CONTROL DEVICE

Figure 8:
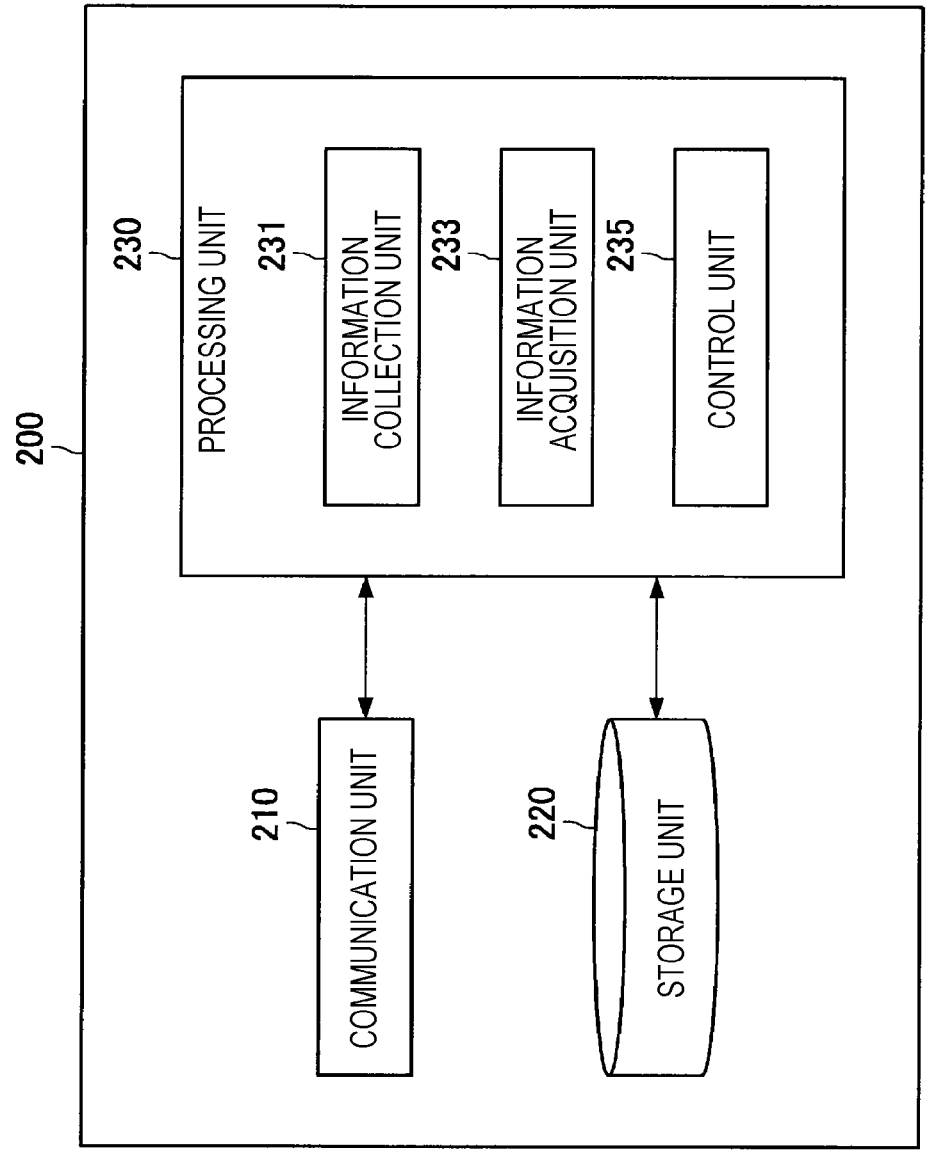
FIG. 8 is a diagram illustrated to describe an exemplary schematic configuration of a control device according to the present embodiment.

Then, a schematic configuration of the control device 200 according to an embodiment of the present disclosure is now described with reference to FIGS. 8 to 12. FIG. 8 is a diagram illustrated to describe an exemplary schematic configuration of the control device 200 according to the present embodiment. Referring to FIG. 8, the control device 200 is configured to include a communication unit 210, a storage unit 220, and a processing unit 230.

(Communication Unit 210)

The communication unit 210 transmits and receives information. In one example, the communication unit 210 transmits information to another node and receives information from another node. An example of the other node includes the information processing device 100.

(Storage Unit 220)

The storage unit 220 stores a program and data used for operations of the control device 200 on a temporary or permanent basis.

(Processing Unit 230)

The processing unit 230 enables the control device 200 to perform various functions. The processing unit 230 is configured to include an information collection unit 231, an information acquisition unit 233, and a control unit 235. The processing unit 230 may further include a component other than these components. In other words, the processing unit 230 may also perform an operation other than operations of these components.

(Information Collection Unit 231)

The information collection unit 231 collects the information relating to traffic of a cell group from the information processing device 100 associated with each of a plurality of cell groups. Each of plurality of cell groups includes two or more cells.

(a) Traffic Information

The traffic information is similar to that described above with reference to the information processing device 100, and thus repeated description is omitted.

(b) Example of Collection of Traffic Information

Figure 9:
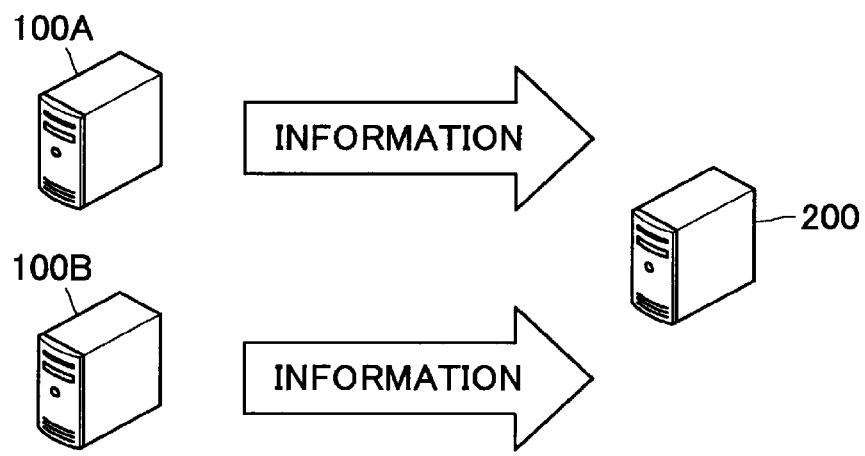
FIG. 9 is a diagram illustrated to describe an example in which the control device collects traffic information.

FIG. 9 is a diagram illustrated to describe an example of collection of traffic information by the control device 200. Referring to FIG. 9, there are illustrated the information processing device 100A associated with the first cell group, the information processing device 100B associated with the second cell group, and the control device 200. The information processing device 100A provides the traffic information relating to traffic of the first cell group for the control device 200, and the information processing device 100B provides the traffic information relating to traffic of the second cell group for the control device 200. In this way, the control device 200 collects the traffic information relating to traffic of the first cell group from the information processing device 100A and collects the traffic information relating to traffic of the second cell group from the information processing device 100B.

(c) Specific Operation

In one example, the information collection unit 231 requests the information processing device 100 associated with each of the plurality of cell groups to provide the traffic information.

In one example, the information collection unit 231 transmits a message for requesting the provision to the information processing device 100 associated with each of the plurality of cell groups via the communication unit 210. As one example, the message is referred to as a resource status request message. The message may be referred to by different names understandably.

Instead of the report being requested by the information collection unit 231, the information processing device 100 associated with each of the plurality of cell groups may provide the traffic information for the control device 200 independently.

(Information Acquisition Unit 233)

The information acquisition unit 233 acquires traffic information relating to traffic of a cell group for each of the plurality of cell groups. The traffic information is provided by the information processing device 100 associated with the cell group.

In one example, the traffic information collected by the information collection unit 231 is stored in the storage unit 220. The information acquisition unit 233 acquires the traffic information from the storage unit 220 at any subsequent timing.

This makes it possible to reduce a load on a controller (i.e., the control device 200) configured to perform centralized control of a network, in one example.

Control Unit 235

(a) Routing Control

The control unit 235 performs routing control of traffic of the plurality of cell groups based on the traffic information regarding each of the plurality of cell groups. In other words, the control device 200 can include an orchestrator function that perform control of routing and/or network monitoring in addition to the controller function that performs control of a network node.

(a-1) Sharing of Roles Between Information Processing Device 100 and Control Device 200

Routing Control Performed by Information Processing Device 100

As described above, the routing control performed by the information processing device 100 is control of the routing in a network associated with the cell group, in one example. The network includes a base station of each cell included in the cell group. The description on this point is similar to the above description, and thus repeated description is omitted.

Routing Control Performed by Control Device 200

In one example, the routing control performed by the control device 200 (the control unit 235) is control of the routing in a network other than the network associated with each of the plurality of cell groups. The description on this point is similar to the above description, and thus repeated description is omitted.

(a-2) Routing Control Based on Network Information

In one example, the control unit 235 performs the routing control of traffic of the plurality of cell groups, which is further based on information relating to network used for the routing of traffic of the plurality of cell groups (referred to as "network information" hereinafter).

In one example, the network used for the routing of traffic of the plurality of cell groups is the network 40, and the network information is information relating to the network 40.

More specifically, in one example, the network information includes information relating to a line included in the network 40 (e.g. information indicating line capacity and/or transmission delay). In one example, the network information includes information relating to a network node included in the network 40 (e.g. information indicating processing time and/or buffer capacity).

The network information can vary dynamically. Thus, the control device 200 can acquire and update the network information periodically or in response to the occurrence of an event.

Such network information makes it possible to determine a route that is desirable for the traffic, in one example.

(a-3) Selection of Route

In one example, the routing control performed by the control unit 235 includes selecting a route of traffic of each of the plurality of cell groups based on the traffic information regarding each of the plurality of cell groups and the network information. In other words, the control unit 235 selects a route of traffic of each of the plurality of cell groups based on the traffic information regarding each of the plurality of cell groups and the network information.

In one example, the control unit 235 selects a route of traffic of the plurality of cell groups so that the routing of the traffic of the whole cell groups may be optimized. In this case, the routing of the traffic of each individual cell group may be possible not to be optimized.

More specifically, in one example, the control unit 235 preferentially selects a route having a higher speed (e.g. a route having shorter distance) for a cell group having the large amount of traffic.

The control unit 235 may select a route for each packet or for each packet group. Alternatively, the control unit 235 may select a single route of the traffic of the whole cell groups.

(a-4) Priority Control/Band Control

In one example, the routing control performed by the control unit 235 may include allowing a network node to perform priority control or band control for the traffic of the plurality of cell groups, based on the traffic information regarding each of the plurality of cell groups and the network information. In other words, the control unit 235 may allow a network node to perform priority control or band control for the traffic of the plurality of cell groups, based on the traffic information regarding each of the plurality of cell groups and the network information.

More specifically, the control unit 235 may allow a network node (e.g. a network node included in the network 40) to perform the priority control so that the traffic of a cell group having a large amount of traffic may be forwarded preferentially. Alternatively, the control unit 235 may allow a network node (e.g. a network node included in the network 40) to perform the band control so that a wider line band may be allocated for the traffic of a cell group having a large amount of traffic.

(a-5) Control of Network Node

In one example, the routing control performed by the control unit 235 includes controlling a network node that forwards the traffic of the plurality of cell groups. In other words, the control unit 235 controls a network node that forwards the traffic of the plurality of cell groups.

In one example, the network node includes a network node included in the network 40 (e.g. a switch, a router, and/or a gateway). In one example, the control unit 235 controls the network node included in the network 40 so that the traffic of the cell group may be forwarded through the route determined as described above. More specifically, in one example, the control unit 235 transmits control information indicating a forwarding destination to the network node included in the network 40 via the communication unit 210. Consequently, the network node forwards the traffic of the cell group based on the control information. In this regard, the network node may distinguish between traffic streams (in other words, groups of traffic) having different forwarding destinations in units of frames, packets, or segments. More specifically, the network node may distinguish between traffic streams having different forwarding destinations based on any one or a combination of IP address, MAC address, and port number. Furthermore, the network node may be a termination node of tunneling (e.g. general packet radio (GTP) service tunnelling protocol), or may distinguish between traffic streams having different forwarding destinations based on the IP address allocated to the termination node (e.g. tunnelling end ID (TEID)) or a bearer ID.

As described above, the control unit 235 may allow the network node to perform the priority control and the band control. In this case, the control unit 235 may transmit control information indicating the priority control and the band control to the network node via the communication unit 210. Consequently, the network node may perform the priority control and the band control based on the control information.

This makes it possible to perform centralized control of forwarding traffic of the plurality of cell groups.

(b) Control of Configuration of Line/Network Node

In one example, the control unit 235 controls the configuration of a line or a network node included in a network used for the routing of traffic of the plurality of cell groups based on the traffic information regarding each of the plurality of cell groups.

In one example, the network used for the routing of traffic of the plurality of cell groups includes the network 40. In other words, the control unit 235 controls the configuration of a line or a network node included in the network 40.

In one example, the control unit 235 controls the configuration of the line or the network node, based on the traffic information regarding each of the plurality of cell groups or a result of the routing control, and the network information.

In one example, the control unit 235 controls the configuration of a line or a network node included in the network 40 so that the traffic of the plurality of cell groups may be forwarded more smoothly in the network 40.

(b-1) Control of Configuration of Line

In one example, the control unit 235 determines that the configuration of a line included in the network 40 is to be changed and requests an associated network node (e.g. a switch) to perform the change. Consequently, the associated network node performs an operation for the change. An illustrative example of the change in the configuration of a line included in a network is now described with reference to FIG. 10.

Figure 10:
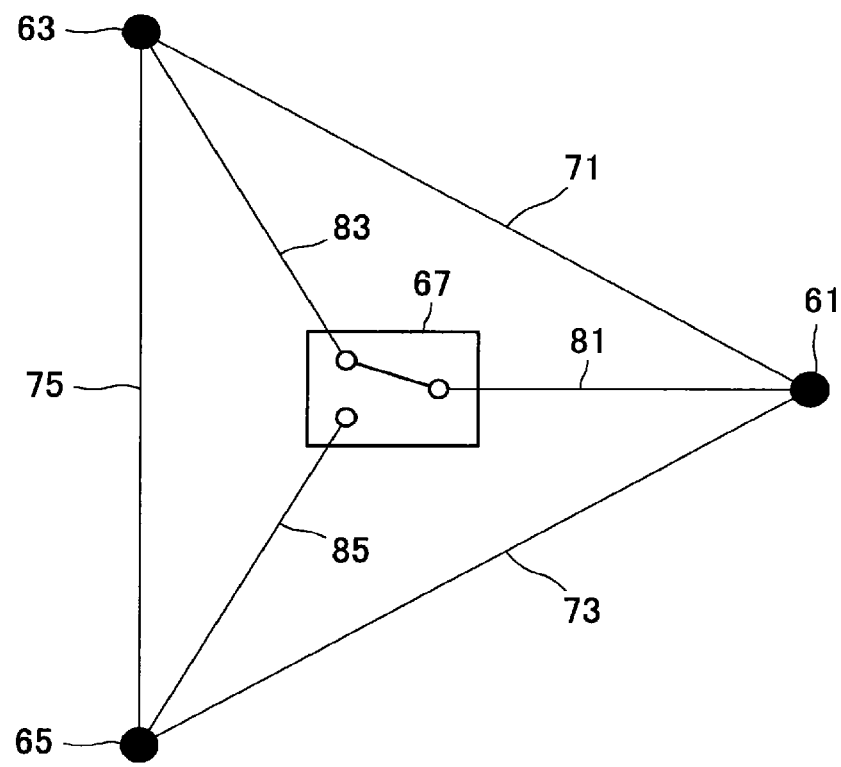
FIG. 10 is a diagram illustrated to describe an example of a change in the configuration of a line included in a network.

FIG. 10 is a diagram illustrated to describe an example of the change in the configuration of a line included in a network. Referring to FIG. 10, there are illustrated network nodes 61, 63, 65, and 67 and lines 71, 73, 75, 81, 83, and 85, which are included in the network 40. The line 71 is a line that connects the network node 61 and the network node 63 to each other. The line 73 is a line that connects the network node 61 and the network node 65 to each other. The line 75 is a line that connects the network node 63 and the network node 65 to each other. The line 81 is a line that connects the network node 61 and the network node 67 to each other. The line 83 is a line that connects the network node 63 and the network node 67 to each other. The line 85 is a line that connects the network node 65 and the network node 67 to each other. In one example, the lines 71, 73, 75, 81, 83, and 85 are lines having band of Pbps. The network node 67 allows a line for connecting two of the network nodes 61, 63, and 65 to be formed by connecting two of the lines 81, 83, and 85.

In the first example, the amount of traffic that is transmitted or received between the network node 61 and the network node 63 is larger than the amount of traffic that is transmitted or received between the network node 61 and the network node 65 and the amount of traffic that is transmitted or received between the network node 63 and the network node 65. In this case, the network node 67 connects the line 81 and the line 83 to each other. Consequently, the line 81 and the line 83 connect the network node 61 and the network node 63 to each other. The band between the network node 61 and the network node 63 is 2 Pbps.

In the second example, the amount of traffic that is transmitted or received between the network node 61 and the network node 65 is larger than the amount of traffic that is transmitted or received between the network node 61 and the network node 63 and the amount of traffic that is transmitted or received between the network node 63 and the network node 65. In his case, the network node 67 connects the line 81 and the line 85 to each other. Consequently, the line 81 and the line 85 connect the network node 61 and the network node 65 to each other. The band between the network node 61 and the network node 65 is 2 Pbps.

(b-2) Control of Configuration of Network Node

In one example, the control unit 235 determines that the configuration of a network node included in the network 40 is to be changed and requests an associated network node to perform the change. Consequently, the associated network node performs an operation for the change.

As one example, the control unit 235 determines that the size of a buffer of a network node is to be changed so that the network node may hold traffic to be forwarded. Then, the control unit 235 requests the network node to change the size of a buffer.

As another example, the control unit 235 determines that a virtualized network node is to be added or deleted. Then, the control unit 235 requests a network node that implements a virtualized network node to add or delete the virtualized network node.

As described above, the control unit 235 controls the configuration of a line or a network node included in a network used for the routing of traffic of the plurality of cell groups based on the traffic information regarding each of the plurality of cell groups. This makes it possible to forward the traffic of the plurality of cell groups smoothly.

The network used for the routing of traffic of the plurality of cell groups may further include a network associated with each of the cell groups (e.g. a network including a base station and the network 30) in addition to the network 40. In other words, the control device 200 (the control unit 235) may further control a line or a network node included in a network associated with each of the cell groups. In this case, the control device 200 (the control unit 235) may determine frequency band for each cell group (or frequency band for a cell included in each of the cell groups). Alternatively, the information processing device 100 (the control unit 137) may control the configuration of a line or a network node included in a network associated with each of the cell groups.

(c) Control of Cell Group

The control unit 235 may change a cell included in a cell group included in the plurality of cell groups. In other words, the control unit 235 may change a cell included in a cell group within the coverage of the information processing device 100.

More specifically, the control unit 235 may delete at least one cell from a cell group included in the plurality of cell groups and may add the at least one cell to another cell group included in the plurality of cell groups. In one example, the at least one cell may include a macrocell. Furthermore, the at least one cell may further include a small cell that overlaps with the macrocell.

The control unit 235 may change a cell included in a cell group included in the plurality of cell groups based on the traffic information regarding each of cell groups included in the plurality of cell groups. As one example, at least one cell may be deleted from a cell group having a large amount of traffic and the at least one cell may be added to a cell group having a small amount of traffic. On this point, an illustrative example is described below with reference to FIGS. 11 and 12.

Figure 11:
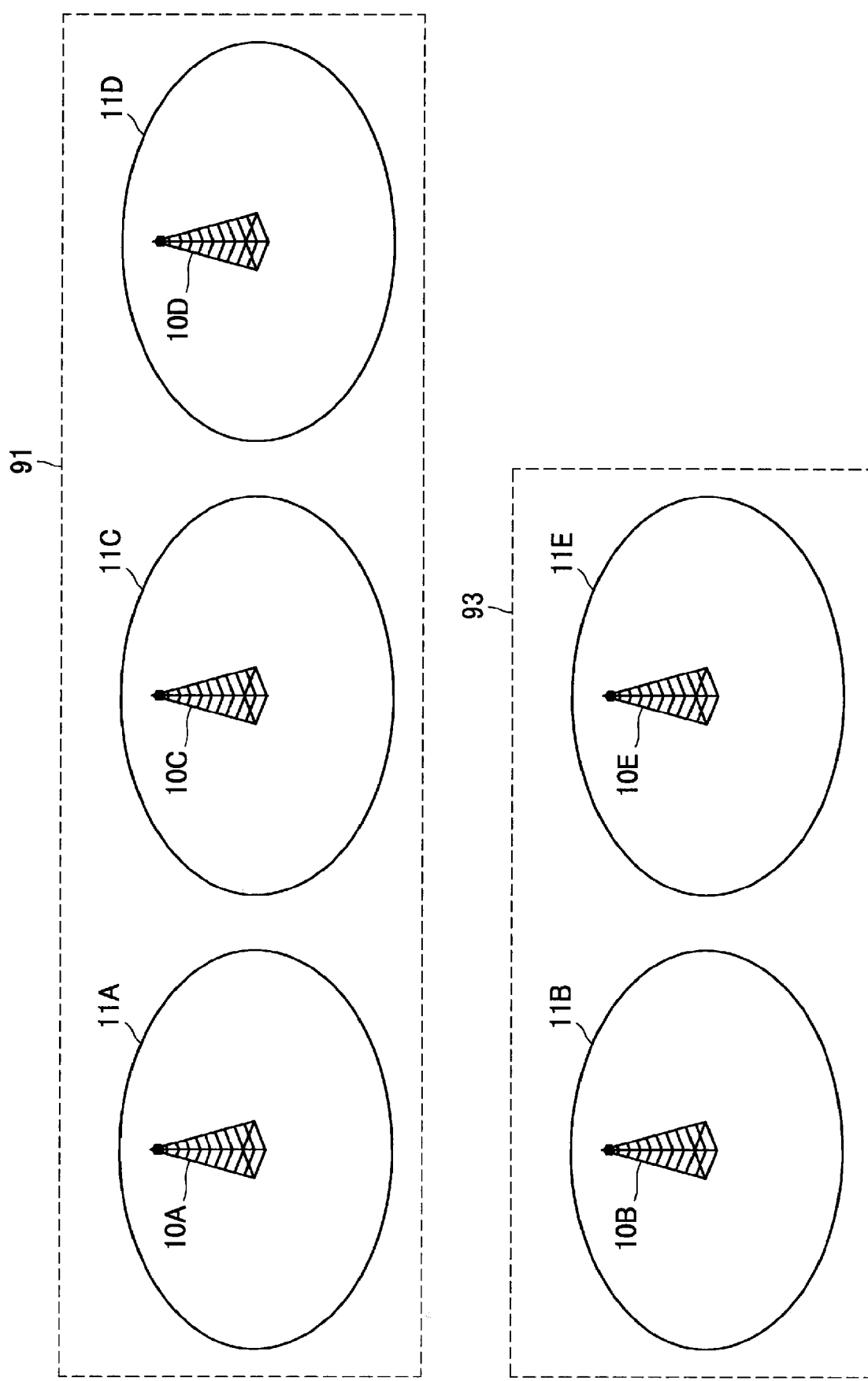
FIG. 11 is a first diagram illustrated to describe an example of a change in cells included in a cell group.
Figure 12:
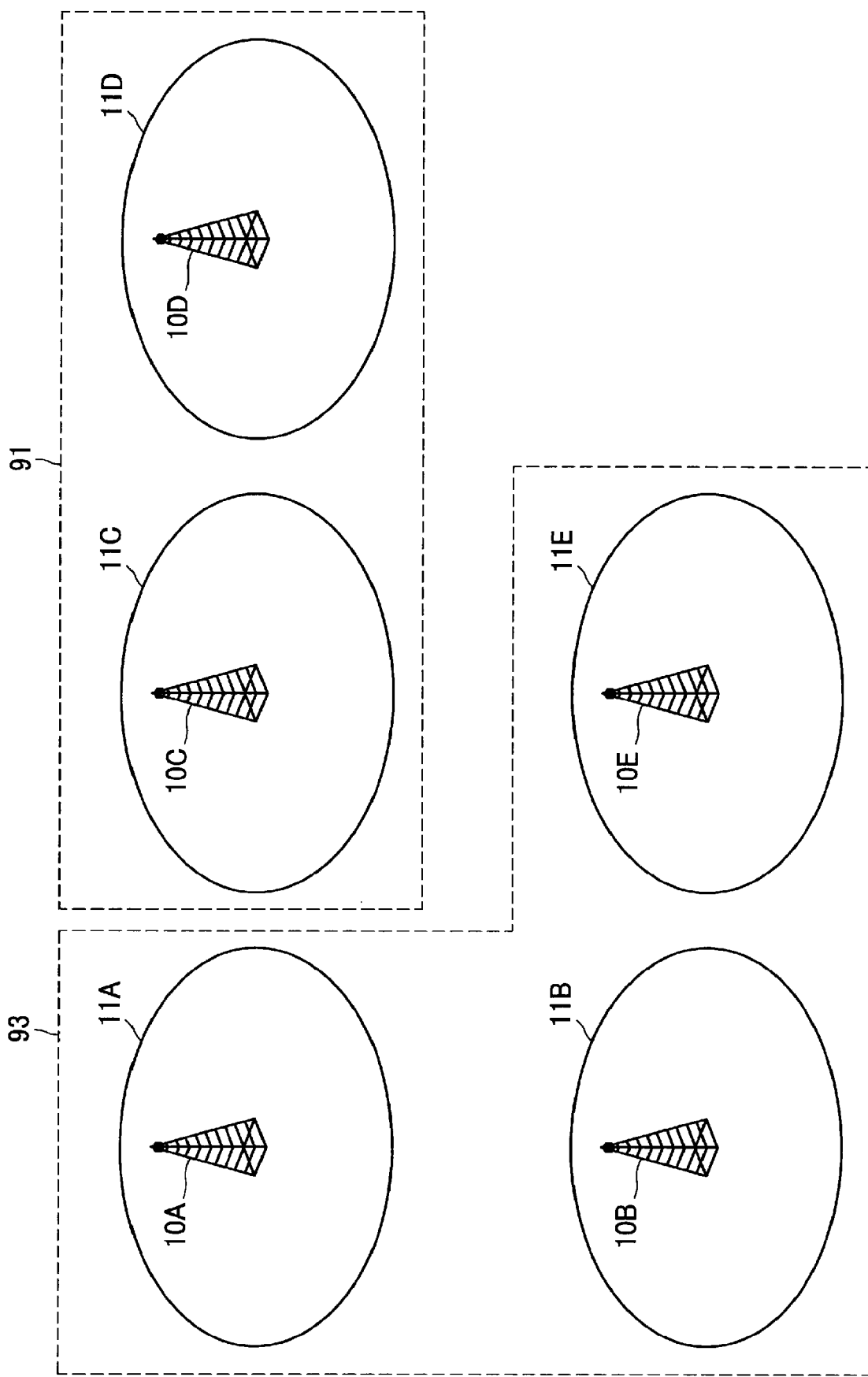
FIG. 12 is a second diagram illustrated to describe an example of a change in cells included in a cell group.

FIGS. 11 and 12 are diagrams illustrated to describe an example of a change in cells included in a cell group. Referring to FIG. 11, in one example, a first cell group 91 and a second cell group 92 are illustrated. The first cell group 91 includes a macrocell 11A, a macrocell 11C, and a macrocell 11D. The first cell group 91 may further include one or more small cells 21, which overlap with each of the macrocell 11A, the macrocell 11C, or the macrocell 11D. The second cell group 93 includes a macrocell 11B and a macrocell 11E. The second cell group 93 may further include one or more small cells 21, which overlap with each of the macrocell 11B and the macrocell 11E. In this example, the amount of traffic of the first cell group 91 is large, and the amount of traffic of the second cell group 93 is small. In this regard, referring to FIG. 12, in one example, the control unit 235 deletes the macrocell 11A (and the small cell 21 that overlaps with the macrocell 11A) from the first cell group 91 having a large amount of traffic, and adds the macrocell 11A (and the small cell 21 that overlaps with the macrocell 11A) to the second cell group 93 having a small amount of traffic.

As a specific process, the control unit 235 may determine to change a cell group and may request the information processing device 100 to perform the change. Consequently, a cell group within the coverage of the information processing device 100 may be changed.

As described above, the control unit 235 may change a cell included in a cell group included in the plurality of cell groups, in one example. This makes it possible to level the traffic between cell groups, in one example. Thus, the load can be leveled by a network associated with the cell group and/or the information processing device 100.

(d) Control of Frequency Band for Cell Group

The control unit 235 may control the frequency band for a cell group included in the plurality of cell groups.

In one example, the control unit 235 may control the frequency band for the cell group based on the traffic information regarding the cell group.

In one example, when there is a cell group having a large amount of traffic among the plurality of cell groups, the control unit 233 may increase the frequency band for the cell group (specifically, frequency band that can be used in some or all of the cell groups, in one example). The control unit 233 requests a frequency management system to permit a use of the shared band in the some or all of the cell groups (i.e., frequency band that is shared between a plurality of wireless communication systems), and may allocate the frequency band that is permitted to be used to the some or all of the cell groups. This makes it possible to adjust the amount of radio resources that can be used for the cell depending on the increase or decrease of traffic in a cell group, in one example.

The control unit 235 may notify the allocated frequency band to the information processing device 100 or the associated base station (e.g. the base station 10 and/or the base station 20) via the communication unit 210.

The control unit 235 may control the frequency band based on a result of the routing control performed by the control unit 235.

4. PROCESSING PROCEDURE

Then, an exemplary process according to an embodiment of the present disclosure is described with reference to FIGS. 13 to 16.

Provision and Collection of Information Relating to Traffic

(a) Base Station and Information Processing Device 100

Figure 13:
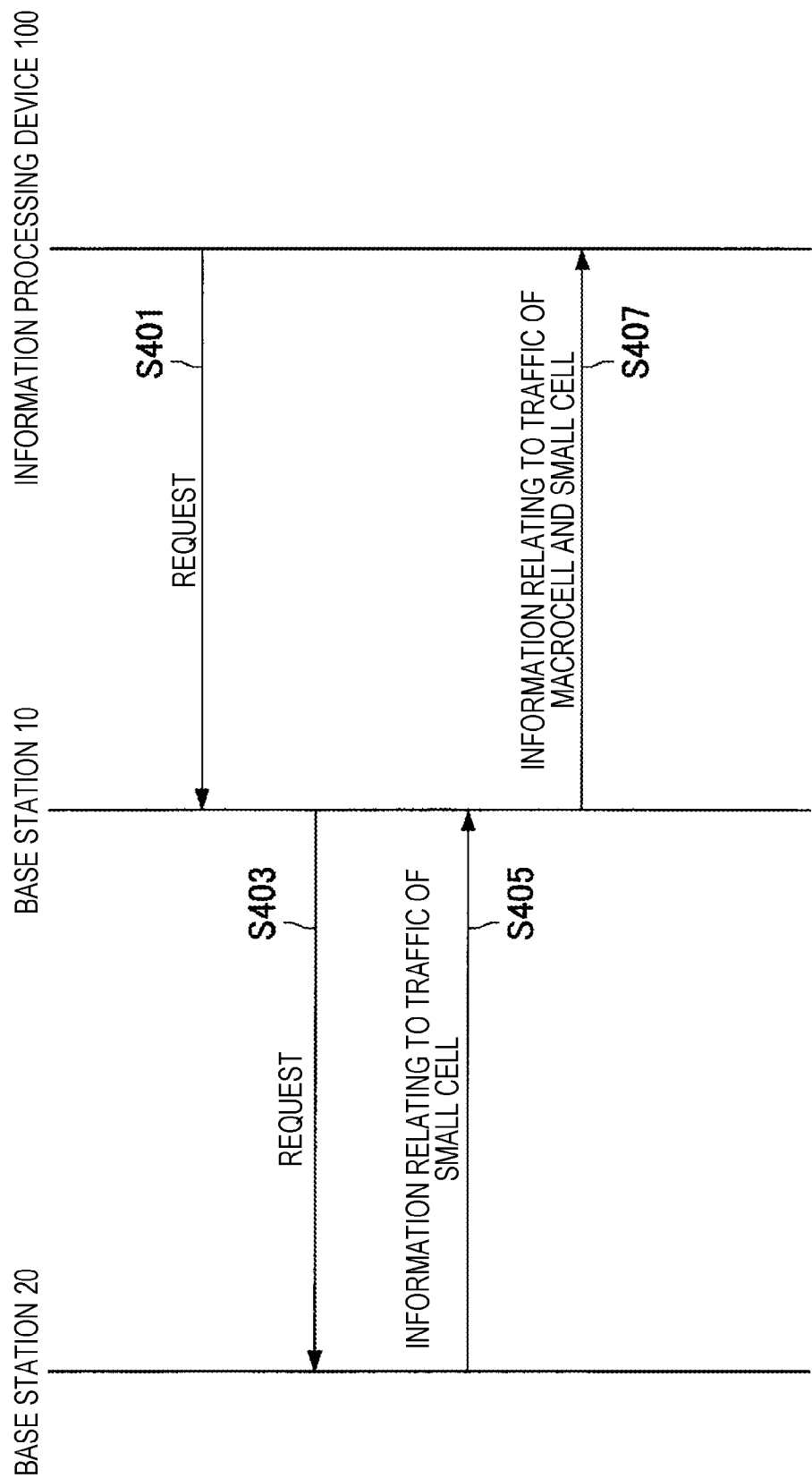
FIG. 13 is a sequence diagram illustrating an exemplary schematic procedure of a process for reporting or collecting information relating to traffic of a cell.

FIG. 13 is a sequence diagram illustrating an exemplary schematic procedure of a process for reporting or collecting the information relating to traffic of a cell.

The information processing device 100 associated with a cell group requests the base station 10 of the macrocell 11 included in the cell group to report the information relating to traffic (S401). More specifically, in one example, the information processing device 100 transmits a message for requesting the report to the base station 10.

Then, the base station 10 of the macrocell 11 requests the base station 20 of the small cell 21 that overlaps with the macrocell 11 to report the information relating to traffic (S403). More specifically, in one example, the base station 10 transmits a message for requesting the report to the base station 20.

The base station 20 of the small cell 21 reports the information relating to traffic of the small cell 21 to the base station 10 of the macrocell 11 (S405). More specifically, in one example, the base station 20 transmits a message including the information relating to traffic of the small cell 21 to the base station 10.

Then, the base station 10 of the macrocell 11 reports information relating to traffic of the macrocell 11 and the small cell 21 to the information processing device 100 (S407). More specifically in one example, the base station 10 transmits a message including the information relating to traffic of the macrocell 11 and the small cell 21 to the information processing device 100.

(b) Collection of Information from Information Processing Device 100 by Control Device 200

Figure 14:
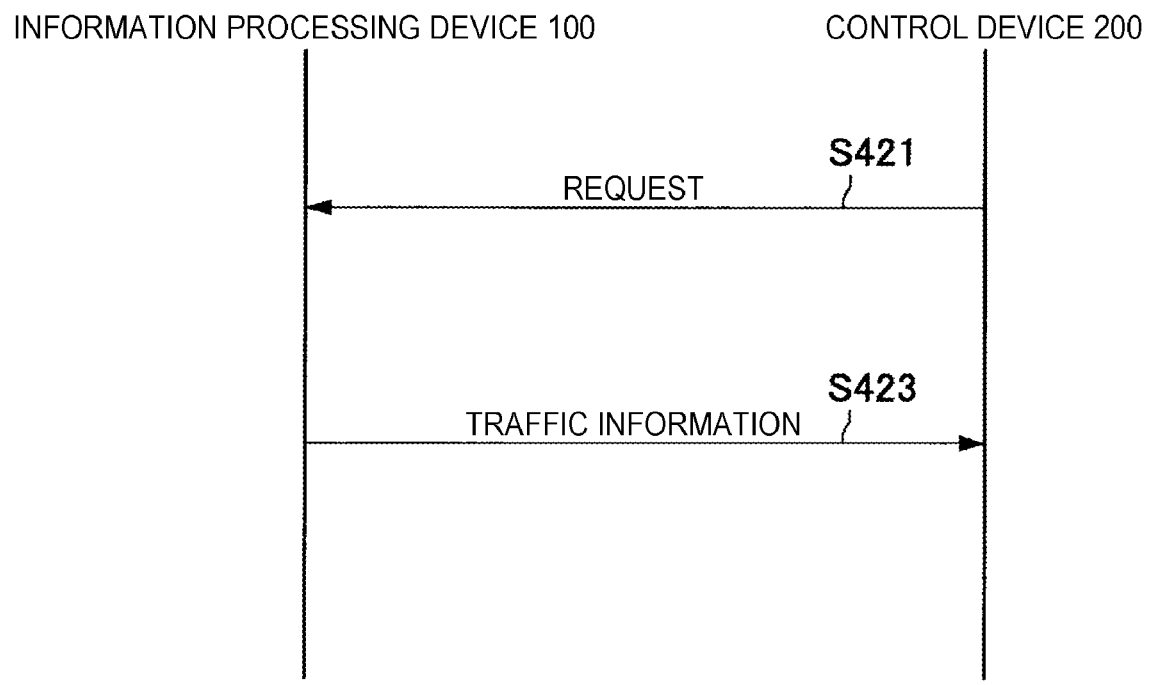
FIG. 14 is a sequence diagram illustrating an exemplary schematic procedure of a process for providing or collecting information relating to traffic of a cell group.

FIG. 14 is a sequence diagram illustrating an exemplary schematic procedure of a process for providing or collecting the information relating to traffic of a cell group.

The control device 200 requests the information processing device 100 associated with each of the plurality of cell groups to provide traffic information (S421). More specifically, in one example, the control device 200 transmits a message for requesting the provision to the information processing device 100 associated with each of the plurality of cell groups.

The information processing device 100 provides the traffic information relating to traffic of a cell group for the control device 200 (S423). More specifically, in one example, the information processing device 100 transmits a message including the traffic information to the control device 200.

Routing Control

(a) Routing Control by Information Processing Device 100

Figure 15:
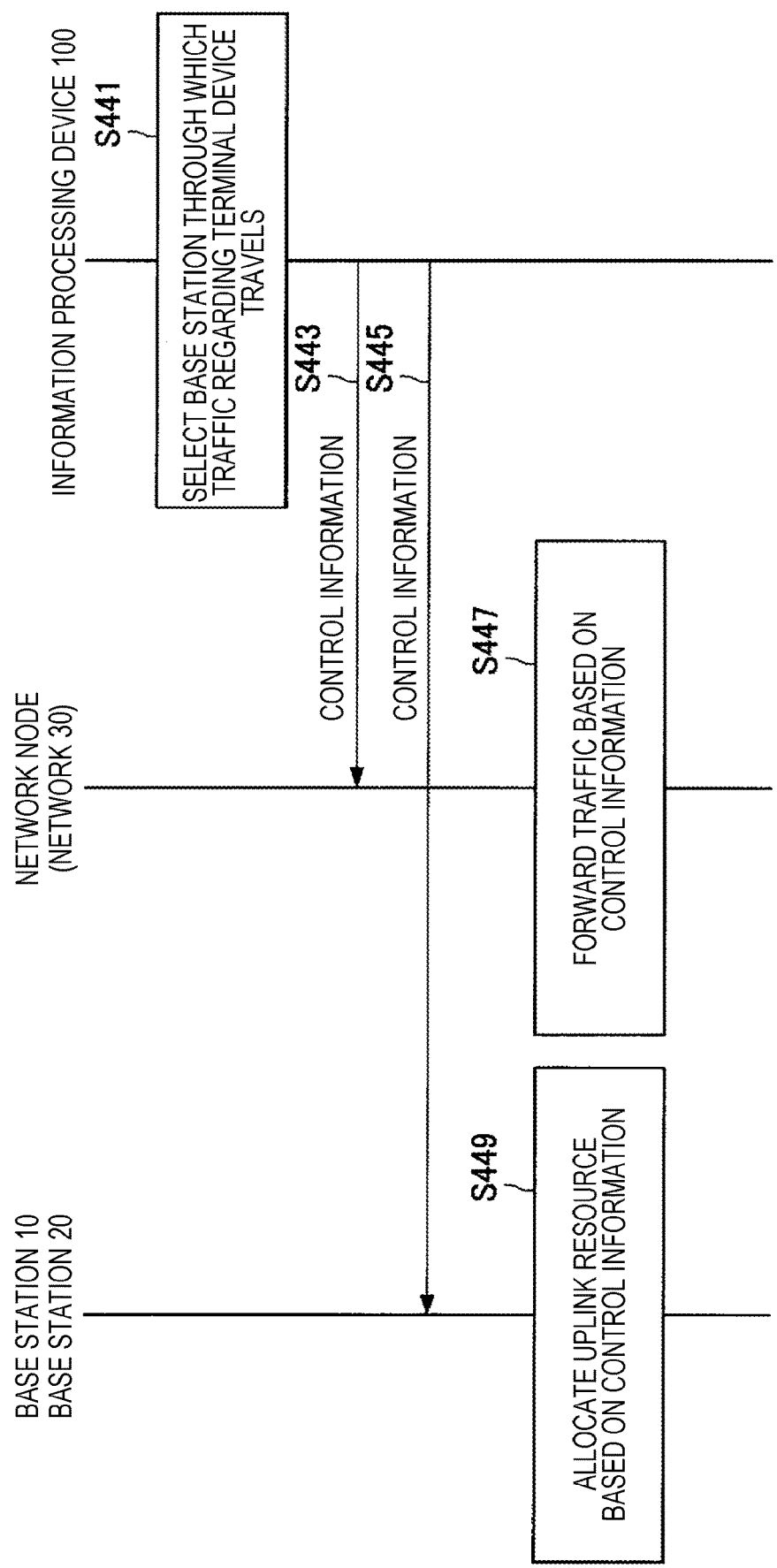
FIG. 15 is a sequence diagram illustrating an exemplary schematic procedure of a routing control process performed by the information processing device.

FIG. 15 is a sequence diagram illustrating an exemplary schematic procedure of a routing control process performed by the information processing device 100.

The information processing device 100 selects a base station through which the traffic regarding a terminal device located in a cell included in a cell group travels (S441).

Then, the information processing device 100 transmits control information indicating a forwarding destination to a network node included in the network 30 (S443). The information processing device 100 transmits control information, which indicates the allocation of an uplink resource to the terminal device, to the selected base station (S445).

Then, the network node included in the network 30 forwards the traffic regarding the terminal device based on the control information (S447). The selected base station allocates an uplink resource to the terminal device based on the control information (S449).

(b) Routing Control by Control Device 200

Figure 16:
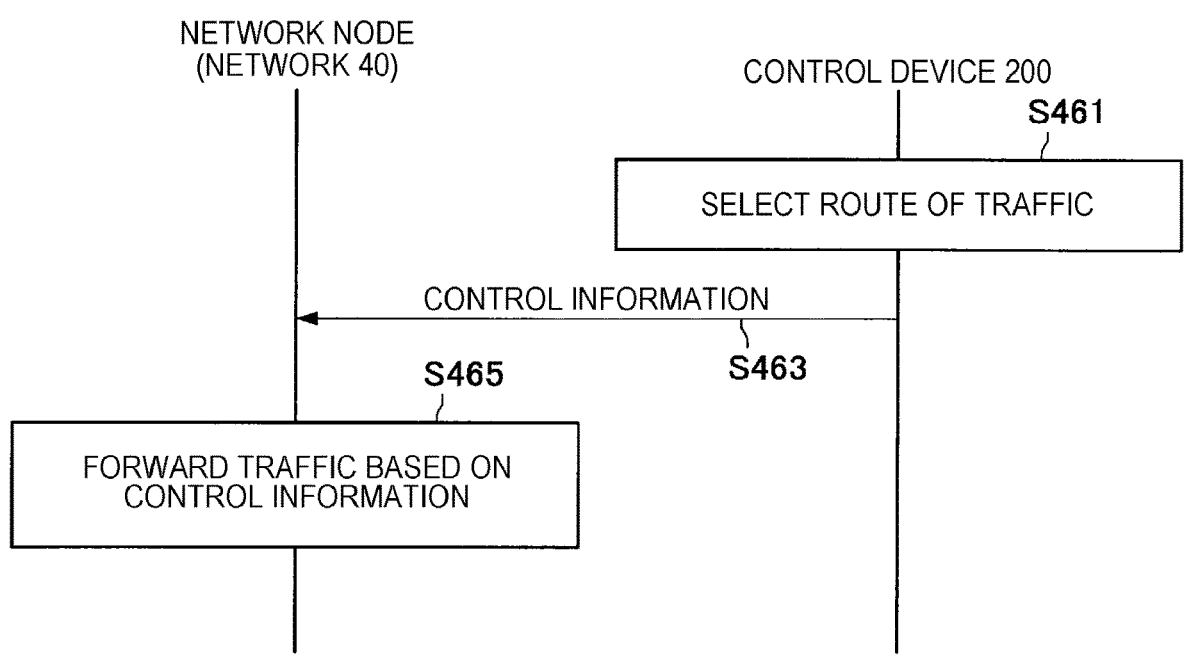
FIG. 16 is a sequence diagram illustrating an exemplary schematic procedure of a routing control process performed by the control device.

FIG. 16 is a sequence diagram illustrating an exemplary schematic procedure of a routing control process performed by the control device 200.

The control device 200 selects a route of traffic of each of the plurality of cell groups based on the traffic information regarding each of the plurality of cell groups (S461).

Then, the control device 200 transmits control information indicating a forwarding destination to a network node included in the network 40 (S463).

Then, the network node included in the network 40 forwards the traffic of the cell group based on the control information (S465).

5. APPLICATION EXAMPLES

The technology according to the present disclosure is applicable to various products. In one example, each of the information processing device 100 and the control device 200 may be implemented as any type of server such as a tower server, a rack server, and a blade server. In addition, at least a part of components of each of the information processing device 100 and the control device 20 may be implemented in a module (e.g. an integrated circuit module configured in one die, or a card or blade inserted into a slot of a blade server) mounted in a server.

(Server)

Figure 17:
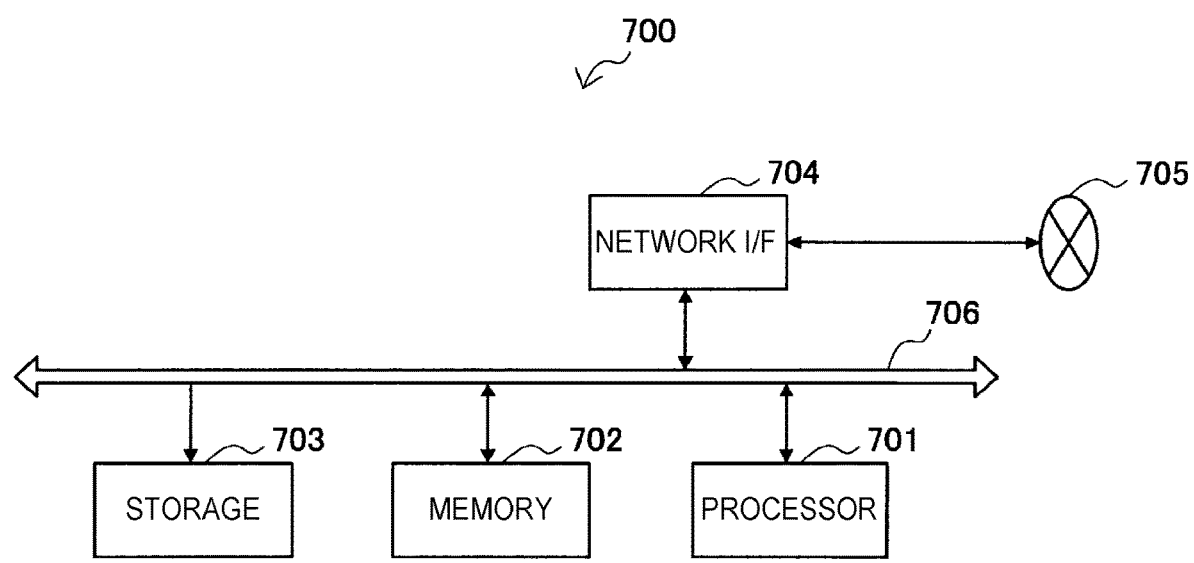
FIG. 17 is a block diagram illustrating an exemplary schematic configuration of a server.

FIG. 17 is a block diagram illustrating an exemplary schematic configuration of a server 700 to which the technology according to the present disclosure is applicable. The server 700 is configured to include a processor 701, a memory 702, a storage 703, a network interface 704, and a bus 706.

The processor 701 may be a central processing unit (CPU) or a digital signal processor (DSP) in one example, and controls the server 700 to execute various types of functions. The memory 702 includes random access memory (RAM) and read only memory (ROM), and stores programs executed by the processor 701 or other data. The storage 703 may include a storage medium such as a semiconductor memory and a hard disk.

The network interface 704 is a wired communication interface used to connect the server 700 to a wired communication network 705. The wired communication network 705 may be a core network such as an evolved packet core (EPC), or may be a packet data network (PDN) such as the Internet.

The bus 706 connects the processor 701, the memory 702, the storage 703, and the network interface 704 to each other. The bus 706 may include two or more buses, each of which has different speed (e.g. a high-speed bus and a low-speed bus).

In the server 700 illustrated in FIG. 17, one or more components ((e.g. the information collection unit 131, the information acquisition unit 133, the information provision unit 135 and/or the control unit 137) included in the processing unit 130 described with reference to FIG. 2 may be incorporated in the processor 701. As one example, a program for causing the processor to function as the above-mentioned one or more components (i.e., a program for causing the processor to execute operations of the one or more components) may be installed in the server 700, and the processor 701 may execute the program. As another example, the server 700 may have a module that includes the processor 701 and the memory 702 to incorporate the one or more components in the module. In this case, the module may store a program for causing the processor to function as the one or more components in the memory 702, and the processor 701 may execute the program. As described above, the server 700 or the module may be provided as a device that includes the one or more components, or the program for causing the processor to function as the one or more components may be provided. In addition, a readable recording medium on which the program is recorded may be provided. In this regard, the one or more components included in the processing unit 230 described above with reference to FIG. 8 (the information collection unit 231, the information acquisition unit 233, and/or the control unit 235) are similar to one or more components included in the processing unit 130.

6. CONCLUSION

Various devices and processes according to the embodiments of the present disclosure have been described with reference to FIGS. 1 to 17.

According to the embodiments of the present disclosure, the information processing device 100 is configured to include the information acquisition unit 133 and the information provision unit 135. The information acquisition unit 133 acquires traffic information relating to traffic of a cell group including two or more cells. The information provision unit 135 provides the traffic information for the control device 200 configured to perform routing control of traffic of a plurality of cell groups including the cell group.

According to the embodiments of the present disclosure, the control device 200 is configured to include the information acquisition unit 233 and the control unit 235. The information acquisition unit 233 acquires traffic information that is provided by the information processing device 100 associated with a cell group for each of a plurality of cell groups, each of which has two or more cells. The traffic information is information relating to traffic of the cell group. The control unit 235 performs routing control of traffic of the plurality of cell groups based on the traffic information for each of the plurality of cell groups.

This makes it possible to reduce the load on a controller (i.e., the control device 200) configured to perform centralized control of a network. More specifically, in one example, the control device 200 is provided with the traffic information relating to traffic of a cell group by the information processing device 100 associated with the cell group for each cell group. Thus, the load necessary to collect the traffic information is distributed between the control device 200 and the information processing device 100. Accordingly, the load on the control device 200 can be reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, a cell group including two or more cells may be a group of base stations including two or more base stations.

In one example, although the description has been made mainly by taking the example in which there is a one-to-one correspondence between a cell included in a cell group and a base station, the present disclosure is not limited thereto. There is not necessarily a one-to-one correspondence between a cell included in a cell group and a base station. As one example, when a base station forms two or more sectors by a sector antenna, each of the two or more sectors may be treated as a cell. In other words, each of the two or more sectors may serve as a cell and may be included in a cell group. As another example, when a base station uses two or more frequency channels, each of the two or more frequency channels (or each area of the two or more frequency channels) may be treated as a cell. In other words, each of the two or more frequency channels (or each area of the two or more frequency channels) may serve as a cell and may be included in a cell group. As a specific example, each of two or more component carriers (or each area, of the two or more component carriers) may serve as a cell and may be included in a cell group. The frequency channel (or an area of the frequency channel) of each of two or more radio access networks (RANs) (e.g. GSM EDGE radio access network (GERAN), UMTS terrestrial radio access network (UTRAN), and/or evolved UMTS terrestrial radio access network (E-UTRAN)) may serve as a cell and may be included in a cell group.

In one example, although the description has been made mainly by taking the example in which a cell of each base station is included in one cell group, the present disclosure is not limited thereto. Two or more cells associated with one base station may be included in different cell groups. As one example, when each base station included in a group of base stations uses a first frequency channel (e.g. UTRAN channel) and a second frequency channel (e.g. E-UTRAN channel), a first cell group includes a cell of the first frequency channel of the group of base stations and a second cell group includes a cell of the second frequency channel of the group of base stations.

In one example, although the description has been made mainly by taking the example in which an information processing device collects information relating to traffic from a base station, the present disclosure is not limited thereto. In one example, an information processing device may collect information relating to traffic from a network node (e.g. a switch or a router) that forwards traffic. Alternatively, when the information processing device is a network node that forwards traffic, the information processing device may generate the information relating to traffic independently instead of collecting the information relating to traffic from another network node (e.g. a base station, a switch, or a router).

In one example, although the description has been made mainly by taking the example in which each of the information processing device and the control device performs the routing control, the present disclosure is not limited thereto. In one example, the routing performed by the information processing device as described above may be performed by the control device. In other words, only the control device may perform the routing control without sharing of the routing control between the control device and the information processing device.

In one example, although the description has been made mainly by taking the example in which a plurality of information processing devices are incorporated in different devices, the present disclosure is not limited thereto. Two or more information processing devices may be incorporated in the same device. In one example, each of the two or more information processing devices may be a virtual device, and may be incorporated in the same device using virtualization technology.

In one example, although the description has been made mainly by taking the example in which the information processing device and the control device are incorporated in different devices, the present disclosure is not limited thereto. A control device and one or more information processing devices may be incorporated in the same device. In one example, each of the control device and the one or more information processing devices may be a virtual device, and may be incorporated in the same device using virtualization technology.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Further, it is also possible to create a computer program (in other words, a computer program for causing the processor to execute an operation of the components of the above-described device) for allowing a processor (e.g. CPU and DSP, etc.) provided in the device (e.g. the information processing device, the control device, or the module thereof) in the present specification to function as the components (e.g. the information collection unit, the information acquisition unit, the information provision unit, and/or the control unit) of the above-described device. Further, it is also possible to provide a recording medium having the above-described computer program recorded therein. Further, it is also possible to provide a device (e.g. a finished product and a module (parts, processing circuits, and chips, etc.) for the finished product) including a memory having the above-described computer program stored therein and one or more processors that can execute the above-described computer program. Further, a method including the operation of the components (e.g. the information collection unit, the information acquisition unit, the information provision unit, and/or the control unit) of the above-described device is included in the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An apparatus including:

an acquisition unit configured to acquire traffic information relating to traffic of a cell group including two or more cells; and a provision unit configured to provide the traffic information for a control device, the control device being configured to perform routing control of traffic of a plurality of cell groups including the cell group.

(2)

The apparatus according to (1), wherein the two or more cells include a macrocell and a small cell, the small cell overlapping with the macrocell.

(3)

The apparatus according to (2), wherein the small cell includes a cell defined by a terminal device, the terminal device operating as a base station.

(4)

The apparatus according to any one of (1) to (3), wherein the traffic information includes information relating to traffic of each cell included in the cell group or is information relating to traffic of a whole of the cell group.

(5)

The apparatus according to any one of (1) to (4), further including:

a collection unit configured to collect information relating to traffic from a base station of one or more cells included in the cell group.

(6)

The apparatus according to (5), wherein the collection unit provides information indicating a condition for a report of the information relating to traffic for the base station of one or more cells included in the cell group.

(7)

The apparatus according to any one of (1) to (6), further including:

a control unit configured to perform routing control of traffic of the cell group.

(8)

The apparatus according to (7), wherein the routing control performed by the control unit is control of routing in a network associated with the cell group, wherein the network includes a base station of each cell included in the cell group, and wherein the routing control performed by the control device is control of routing in a network other than the network associated with each of the plurality of cell groups.

(9)

The apparatus according to (7) or (8), wherein the routing control performed by the control unit includes selecting a base station through which traffic regarding a terminal device located in a cell included in the cell group travels.

(10)

The apparatus according to (9), wherein the control unit selects the base station through which the traffic regarding the terminal device travels based on information relating to channel quality of a cell included in the cell group.

(11)

The apparatus according to (9) or (10), wherein the control unit selects the base station through which the traffic regarding the terminal device travels based on information relating to traffic of a cell included in the cell group.

(12)

The apparatus according to any one of (7) to (11), wherein the routing control includes controlling a network node configured to forward traffic of the cell group.

(13)

The apparatus according to any one of (1) to (12), further including:

a control unit configured to control a frequency band or maximum transmission power for a cell included in the cell group.

(14)

The apparatus according to (13), wherein the control unit controls the frequency band or the maximum transmission power based on information relating to traffic of a cell included in the cell group.

(15)

The apparatus according to any one of (1) to (14), further including:

a control unit configured to control switching between operation modes of a base station of a cell included in the cell group, wherein the switching includes switching the operation modes from one of a first mode and a second mode to the other, wherein the first mode is a mode capable of performing wireless communication with a terminal device, and the second mode is a mode having lower power consumption than the first mode.

(16)

An apparatus including:

an acquisition unit configured to acquire traffic information provided by an information processing device for each of a plurality of cell groups each of which includes two or more cells, the traffic information relating to traffic of the cell group, the information processing device being associated with the cell group; and a control unit configured to perform routing control of traffic of the plurality of cell groups based on the traffic information regarding each of the plurality of cell groups.

(17)

The apparatus according to (16), wherein the information processing device associated with the cell group is a device configured to perform control of routing in a network associated with the cell group, wherein the network includes a base station of each cell included in the cell group, and the routing control performed by the control unit is control of routing in a network other than the network associated with each of the plurality of cell groups.

(18)

The apparatus according to (16) or (17), wherein the routing control includes controlling a network node configured to forward traffic of the plurality of cell groups.

(19)

The apparatus according to any one of (16) to (18), wherein the control unit performs the routing control of traffic of the plurality of cell groups further based on information relating to a network used for routing of the traffic of the plurality of cell groups.

(20)

The apparatus according to any one of (16) to (19), wherein the control unit controls a configuration of a line or a network node, the line or the network node being included in a network used for routing of traffic of the plurality of cell groups.

(21)

A method including:

acquiring traffic information relating to traffic of a cell group including two or more cells; and providing, by a processor, the traffic information for a control device, the control device being configured to perform routing control of traffic of a plurality of cell groups including the cell group.

(22)

A program for causing a processor to execute:

acquiring traffic information relating to traffic of a cell group including two or more cells; and providing the traffic information for a control device, the control device being configured to perform routing control of traffic of a plurality of cell groups including the cell group.

(23)

A readable recording medium having a program recorded thereon, the program causing a processor to execute:

acquiring traffic information relating to traffic of a cell group including two or more cells; and providing the traffic information for a control device, the control device being configured to perform routing control of traffic of a plurality of cell groups including the cell group.

(24)

A method including:

acquiring traffic information provided by an information processing device for each of a plurality of cell groups each of which includes two or more cells, the traffic information relating to traffic of the cell group, the information processing device being associated with the cell group; and performing, by a processor, routing control of traffic of the plurality of cell groups based on the traffic information regarding each of the plurality of cell groups.

(25)

A program for causing a processor to execute:

acquiring traffic information provided by an information processing device for each of a plurality of cell groups each of which includes two or more cells, the traffic information relating to traffic of the cell group, the information processing device being associated with the cell group; and performing routing control of traffic of the plurality of cell groups based on the traffic information regarding each of the plurality of cell groups.

(26)

A readable recording medium having a program recorded thereon, the program causing a processor to execute:

acquiring traffic information provided by an information processing device for each of a plurality of cell groups each of which includes two or more cells, the traffic information relating to traffic of the cell group, the information processing device being associated with the cell group; and performing routing control of traffic of the plurality of cell groups based on the traffic information regarding each of the plurality of cell groups.

REFERENCE SIGNS LIST 1 communication system
10, 20 base station
11 macrocell
21 small cell
30, 40 network
terminal device
100 information processing device
131 information collection unit
133 information acquisition unit
135 information provision unit
137 control unit
200 control device
231 information collection unit
233 information acquisition unit
235 control unit

The invention claimed is:

1. An apparatus, comprising:
 circuitry configured to
  acquire at least one of a traffic load, channel quality, and information on frequency usage of a base station and at least one cell of a group of cells that are connected to the base station via a wireless backhaul;
  request the base station or the at least one cell to route traffic to report the traffic load; and
  perform routing control of traffic including selection of the base station or the at least one cell to route traffic to a terminal device serviced by the base station or the at least one cell, based on at least one of the traffic load, the channel quality, and the frequency usage, wherein
  the respective cells in the group of cells have a coverage area smaller than the base station.

2. The apparatus according to claim 1, wherein the circuitry is configured to provide report condition information indicating when information of the traffic load or the channel quality is to be reported by the base station to the circuitry.

3. The apparatus according to claim 2, wherein the report condition information is requested in a radio resource control (RRC) connection reconfiguration message.

4. The apparatus according to claim 3, wherein the report condition information is set by reporting configurations included in the RRC connection reconfiguration message.

5. The apparatus according to claim 2, wherein the report condition information is requested in response to an event of the traffic load exceeding a predetermined threshold.

6. The apparatus according to claim 1, wherein the channel quality includes at least one of reference signal received power (RSRP), reference signal received quality (RSRQ), channel quality indicator (CQI), signal to interference and noise ratio (SINR), effective communication speed, average information amount per symbol and average coding rate per symbol.

7. The apparatus according to claim 1, wherein
 the routing control performed by the circuitry selects at least two nodes among the base station and the at least one cell of the group of cells, and
 performs coordinated multipoint (CoMP) transmission from the at least two nodes to the terminal device, or from the terminal device to the two nodes.

8. The apparatus according to claim 1, wherein the circuitry is further configured to
 acquire information indicating processing time and/or buffer capacity, and
 control forwarding of traffic to any node of a group of network nodes based on the processing time and/or buffer capacity.

9. The apparatus according to claim 1, wherein the routing control performed by the circuitry selects the base station or the at least one cell through which each packet and/or packet set is routed to the terminal device.

10. The apparatus according to claim 9, wherein traffic is classified by an amount of data that is grouped by packet or flow.

11. The apparatus according to claim 9, wherein traffic is classified into groups of traffic depending on a specified quality of service (QoS) for the traffic.

12. The apparatus according to claim 1, wherein the base station or the at least one cell judges a forwarding destination based on at least any one or any combination of IP address, MAC address, physical cell identity (PCI) allocated to the base station or the at least one cell, a tunnelling end ID (TEID) and a bearer ID.

13. The apparatus according to claim 1, wherein the circuitry is further configured to select the base station or the at least one cell based on which of the base station and the at least one cell has a lower traffic load.

14. The apparatus according to claim 1, wherein the circuitry is further configured to select either the base station or the at least one cell to route traffic to the terminal device based on which of the base station and the at least one cell provides a higher channel quality.

15. The apparatus according to claim 1, wherein the circuitry is configured to acquire the traffic load upon a request to the base station or the at least one cell.

16. The apparatus according to claim 1, wherein circuitry is further configured to perform routing control of traffic including selection of the base station or the at least one cell to route traffic from the terminal device serviced by the base station or the at least one cell, based on at least one of the traffic load, the channel quality, and the frequency usage.

17. A terminal device, comprising:
   circuitry configured to
      perform wireless communication with a base station or at least one cell of a group of cells that are connected to the base station via a wireless backhaul, the respective cells in the group of cells having a coverage area smaller than the base station, wherein
   the base station or the at least one cell of the group of cells is configured to report at least one of traffic load, channel quality, and frequency usage to an information processing device, and
      the base station or the at least one cell is selected by the information processing device to provide service to the terminal device based on the at least one of the traffic load, channel quality, and frequency usage.

18. The terminal device according to claim 17, wherein the base station or the at least one cell is selected for providing traffic to the terminal device, the traffic being classified in groups with a packet being a unit of measurement for the groups.

19. The terminal device according to claim 18, wherein the traffic is classified into the groups based on a specified quality of service (QoS) for the traffic.

20. The terminal device according to claim 17, wherein the circuitry is configured to perform coordinated multipoint (CoMP) transmission from or to the base station and the at least one cell.

* * * * *